(12) United States Patent
O'Mahony et al.

(10) Patent No.: US 7,462,786 B2
(45) Date of Patent: Dec. 9, 2008

(54) NOISE REDUCTION METHOD AND SYSTEM FOR WEIGHT SCALE

(75) Inventors: John J. O'Mahony, Maple Grove, MN (US); Sonny Behan, Sugar Hill, GA (US); Andrew V. Halpert, Coral Springs, FL (US); Edward G. Rychlick, Maple Grove, MN (US)

(73) Assignee: CHF Solutions, Inc., Brooklyn Park, MN (US)

( * ) Notice: Subject to any disclaimer, the term of this patent is extended or adjusted under 35 U.S.C. 154(b) by 0 days.

(21) Appl. No.: 11/683,110

(22) Filed: Mar. 7, 2007

(65) Prior Publication Data

US 2007/0144794 A1    Jun. 28, 2007

Related U.S. Application Data

(63) Continuation of application No. 10/807,370, filed on Mar. 24, 2004, now Pat. No. 7,199,312.

(60) Provisional application No. 60/459,971, filed on Apr. 4, 2003.

(51) Int. Cl.
    *G01G 19/00* (2006.01)
(52) U.S. Cl. ............... 177/185; 340/613; 128/DIG. 13; 604/318
(58) Field of Classification Search ............ 340/613; 128/DIG. 13; 604/318; 177/45–50, 184–189
    See application file for complete search history.

(56) References Cited

U.S. PATENT DOCUMENTS

| 4,726,435 | A  | * | 2/1988  | Kitagawa et al. | ............ 177/187 |
| 4,782,904 | A  | * | 11/1988 | Brock | ........................ 177/185 |
| 4,817,026 | A  | * | 3/1989  | Inoue et al. | ................. 708/300 |
| 4,931,777 | A  | * | 6/1990  | Chiang | ........................ 340/613 |
| 5,237,864 | A  |   | 8/1993  | Castle et al. | |
| 5,945,638 | A  | * | 8/1999  | Maddocks | .................... 177/16 |
| 6,271,484 | B1 | * | 8/2001  | Tokutsu | ................... 177/25.13 |
| 6,590,167 | B2 | * | 7/2003  | Clare | ...................... 177/25.13 |
| 6,689,960 | B2 | * | 2/2004  | Aoki | ........................ 177/25.13 |
| 6,690,280 | B2 | * | 2/2004  | Citrenbaum et al. | ........ 340/603 |
| 6,774,319 | B2 | * | 8/2004  | Aoki et al. | ................... 177/144 |
| 7,129,424 | B2 | * | 10/2006 | Vilhjalmsson et al. | ... 177/25.13 |

OTHER PUBLICATIONS

"Equation of Motion: Natural Frequency" at < http://personal.cityu.edu.hk/~bsapplec/natural.htm > Mar. 24, 2008.*

* cited by examiner

*Primary Examiner*—Randy W Gibson
(74) *Attorney, Agent, or Firm*—Nixon & Vanderhye P.C.

(57) ABSTRACT

A weight scale including: a measuring electronic circuit including a filter; a load cell attachable to a support housing and generating a load signal processed by the filter of the electronic circuit; a spring coupled to the load cell to apply a force to the load cell, wherein the load signal is indicative of the force, and a scale beam connected to the spring and to the support housing, wherein a weight to be measured is attached to the scale beam and the force applied by the spring is indicative of the weight, and wherein natural frequencies of the weight and spring is higher than a cut-off frequency of the filter.

29 Claims, 20 Drawing Sheets

NOISE REDUCTION METHOD AND SYSTEM FOR WEIGHT SCALE

RELATED APPLICATION

This application is a continuation of U.S. application Ser. No. 10/807,370 filed Mar. 24, 2004 and claims the benefit of U.S. provisional application Ser. No. 60/459,971, filed on Apr. 4, 2003, the entirety of both of which applications are incorporated by reference.

FIELD OF INVENTION

The invention relates generally to the field of an electronic weigh scales and, in particular, to scales for weighing fluid collection bags in an extracorporeal circuit.

BACKGROUND TO INVENTION

Medical devices often require accurate weight sensors to measure the weight of fluid collection bags being used to collect filtrate from ultrafiltration, continuous renal replacement therapy (CRRT) and other such medical therapies. Generally, weight sensors having high repeatability and accuracy tend to be fragile and susceptible to damage. In contrast, structurally robust weight sensors that can withstand impacts and unexpected high forces tend to be less sensitive and prone to inaccuracies in their weight measurements. In appears that the opposing requirements of weight sensor robustness and weigh measurement accuracy often require that sacrifices be made by the designer to the robustness and accuracy of the weight sensor under design. Nevertheless, there is a long-felt need for a weight sensor for medical devices and particularly for weighing medical fluid collection bags that is structurally robust and yield accurate, sensitive and repeatable weight measurements.

Accurate weight sensors are particularly necessary when weight measurements are applied to trigger alarms in a medical device. These alarms are often triggered by weights that are subject to narrow tolerances and the alarms are established to protect patient safety. Further, medical devices with narrow tolerances in weights that trigger an alarm are prone to have high incidences of alarms, many of which are triggered by non-dangerous events. A weight sensitive alarm may be triggered as a medical device is intentionally moved. Movement of a medical device may not suggest a dangerous condition, and should not trigger an alarm. An alarm may need to be triggered if there is a rapid change in the weight of a fluid collection bag, which may indicate a dangerous condition. A nurse or other medical practitioner may become numb to alarms from a medical device, if alarms are frequently triggered by benign events. For example, frequent alarms triggered by intentional movement of a medical device movement may result in nurses not responding promptly to any alarm from that device including those alarms caused by rapid changes in bag weight. The failure to promptly respond to an alarm triggered by a dangerous condition may put the patient in danger. Thus, there is a great need to make alarms more robust to false alarms while ensuring that alarms be reliably triggered by excessive weight gain in a fluid collection bag.

SUMMARY OF INVENTION

The current invention comprises an accurate strain gauge beam that has been made robust to mechanical overstrain by the addition of overload protection. The user may push, pull and twist the scale in any direction without over straining the highly sensitive strain gauge beam thereby maintaining weight scale accuracy.

An algorithm has been developed which uses two low pass filters with different cut off frequencies that has the ability to distinguish between the system being moved resulting in the weight scale oscillating at its natural frequency or a frequency induced by the pendulum motion of the ultrafiltrate bag attached to the weight scale and real world alarm conditions. The noise rejection algorithm uses the filter properties that both low pass filters will smooth out high frequencies and that the output of the filters will track each other at signal frequencies higher than 0.6 Hz because of the damping imposed by the filters. At frequencies less than 0.002 Hz equating to a lag error of 20 grams for the described weight scale (Equivalent to a ramp flow of ultrafiltrate of 45 liters/hr which is 90 times higher than the current settable max ultrafiltrate rate of 0.5 liter/hr) both filters will track each other within a tracking error acceptability limit. In the frequencies between the described frequencies the filter outputs will end up out of synchronization resulting in a tracking error outside of acceptability limits. Under this condition an alarm will be declared informing the user of the real world issue.

The invention may be embodied as a weight scale comprising: a load cell mounted to a support housing; a spring coupled to the load cell to apply a force to the load cell; a scale beam connected to the spring and at a proximal end connected to the support housing, and an overload protection bore comprising an aperture through which extends said beam and said aperture having at least one edge in a path of said beam, wherein said edge terminates said path and the beam has maximum rated load position in the path before the edge.

The invention may also be embodied as a method for compensating for non-linear displacement of a beam in a weight scale having a load cell, the method comprising: coupling a distal end of the beam to the load cell mounted such that a weight applied to the beam causes a force to be applied to the cell; the force applied to the cell causes the strain gauge to generate a signal non-linearly related to the weight; processing the signal from the strain to compensate for the non-linearity of the signal by deriving a correction factor from a lookup table having a series of correction factors for various known weights, wherein the correction factors account for the non-linearity of the beam displacement.

DESCRIPTION OF THE INVENTION

Figure 1:
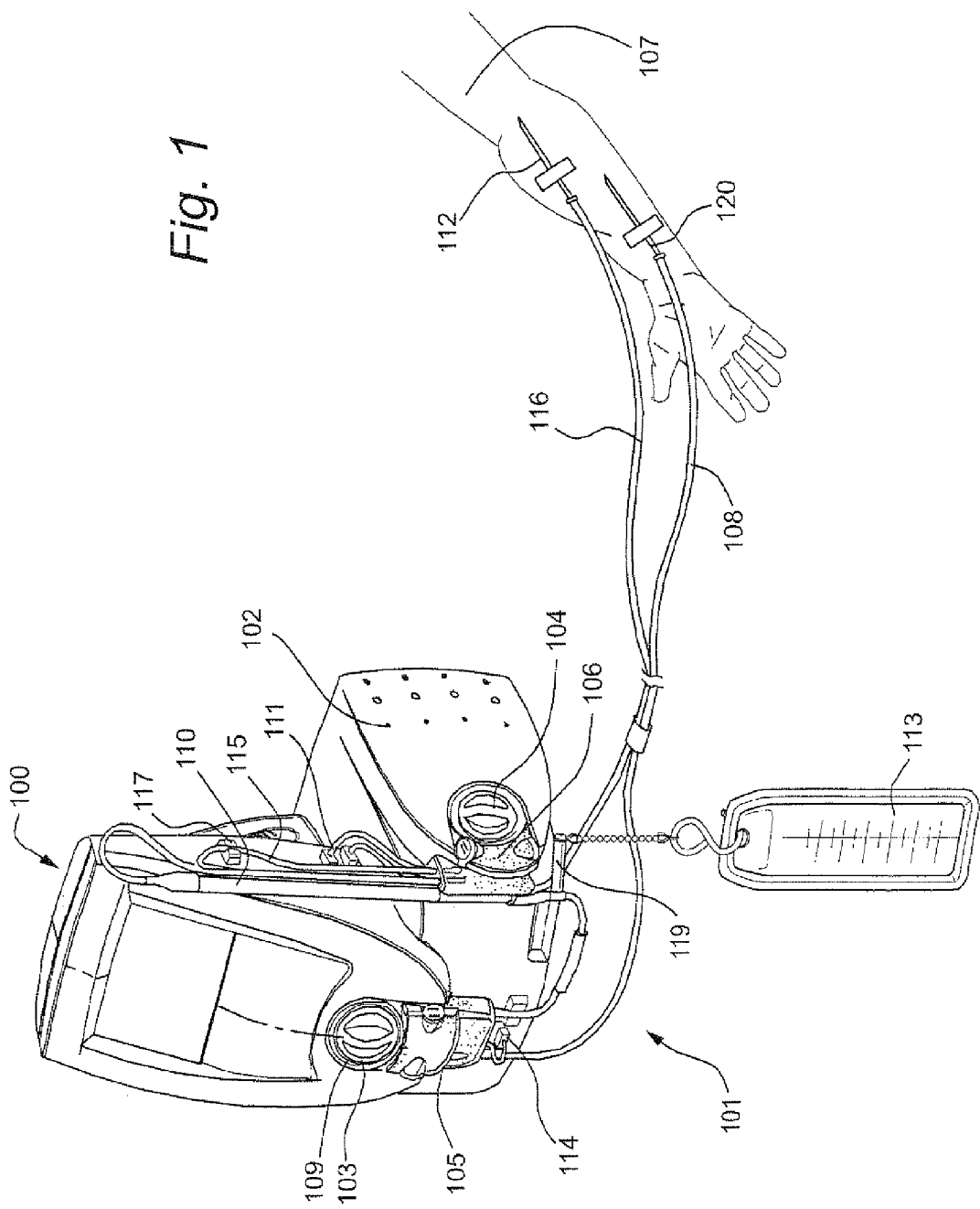
FIG. 1 is a perspective diagram of a front panel of an ultrafiltration pump console.

FIG. 1 shows an ultrafiltration device 100 for the removal of isotonic fluid from the blood of patients 107 suffering from fluid overload. The device 100 includes a disposable extra-corporeal blood circuit 101 that is releasably mounted on a peristaltic pump console 102. The console includes a first peristaltic pump 103 that controls a rate at which blood is withdrawn from the patient 107. A second peristaltic pump 104 controls a rate of filtrate, e.g. isotonic fluid, flowing from a blood filter 110 of the circuit. The circuit 101 further includes a pair of circuit cartridges 105, 106 that may be removed or attached to the pumps and their console. The major blood circuit components comprise the tubing 108, 109, 115, 116; cartridges 105, 106; filter 110; pressure sensors 111, 114; blood leak detector 117 and a filtrate collection bag 113. The blood circuit may be disposed of after one ultrafiltration use.

Blood is withdrawn from the patient 107 through a peripheral access cannula 120 and into a withdrawal tube 108. The rate of blood withdrawal is determined by the rotational speed of the first (blood) peristaltic pump 103 that compresses a loop section 109 of the withdrawal tube 108 mounted in a raceway of the pump 103. The withdrawal tubing 108 passes through the pump (see tube loop section 109) and extends to the inlet at the bottom of the filter 110.

The tubing loop section 109 extends as a loop from the cartridges 105 of the blood circuit. The cartridge 105 holds the tubing loop section 109 so that it may be easily inserted into the pump by an operator. The cartridge 105 also attaches to the console to hold the tube loop 109 in alignment with the pump. Similarly, the other cartridge 106 holds a loop section of a filtrate line 115 in alignment with the second peristaltic pump 104, and assists the operator in inserting the filtrate line into that pump.

The blood flowing through the blood tubing is monitored on the withdrawal side 108 by an inline blood pressure sensor 114 which may be integral with the disposable circuit 101. Blood is pumped by the first (blood) peristaltic pump 103 through a hollow fiber membrane of the filter 110. The blood passing through the blood passage of the filter (and not through the membrane) is returned to the patient via an infusion tube line 116 which leads to a second peripheral blood vessel access site 112 on the patient. A second (infusion) disposable pressure sensor 111 monitors the blood pressure in the infusion line.

Filtrate fluid passes through the filter membrane of the filter 110, and enters the filtrate tubing line 115. The filtrate line is coupled to the second (filtrate) peristaltic pump 104 that controls the withdrawal rate of isotonic fluid (filtrate) from the patient's blood. The filtrate flows from the filtrate line into the collection bag 113 which is attached to the weight scale 119.

The weight scale 119 includes a standard Whetstone bridge to sense the resistance change in the strain gauge 206 as the load changes that is applied to the load cell 202. The output voltage from the Whetstone bridge is amplified using an instrumentation amplifier with a gain based upon the desired weight scale operational range of, for example, −0.1 kg (kilogram) to 1.6 kg and an output voltage range of 0 to 5 volts. This amplified output voltage is digitized by analog to digital converter (ADC) and manipulated by the device computer processor (in a conventional manner) to convert the measured ADC counts to a weight in units of $\frac{1}{10}^{th}$ grams. The weight data is applied by a computer processor in the device 100 to determine if the ultrafiltrate bag 113 is full or if the ultrafiltration rate extracted by the ultrafiltration pump is outside allowable filtration rates. Limits may be also programmed in the processor to sense if the rate of weight gain or loss of the collection bag is outside of rate limits. For example, a weight loss in the collection bag may suggest that the bag is leaking. Further, a lower than expected rate of weight gain of the bag may suggest that the filter is not functioning properly. The computer processor would cease or reduce ultrafiltration, and an alarm will be annunciated to the user when a limit is exceeded.

Figure 2:
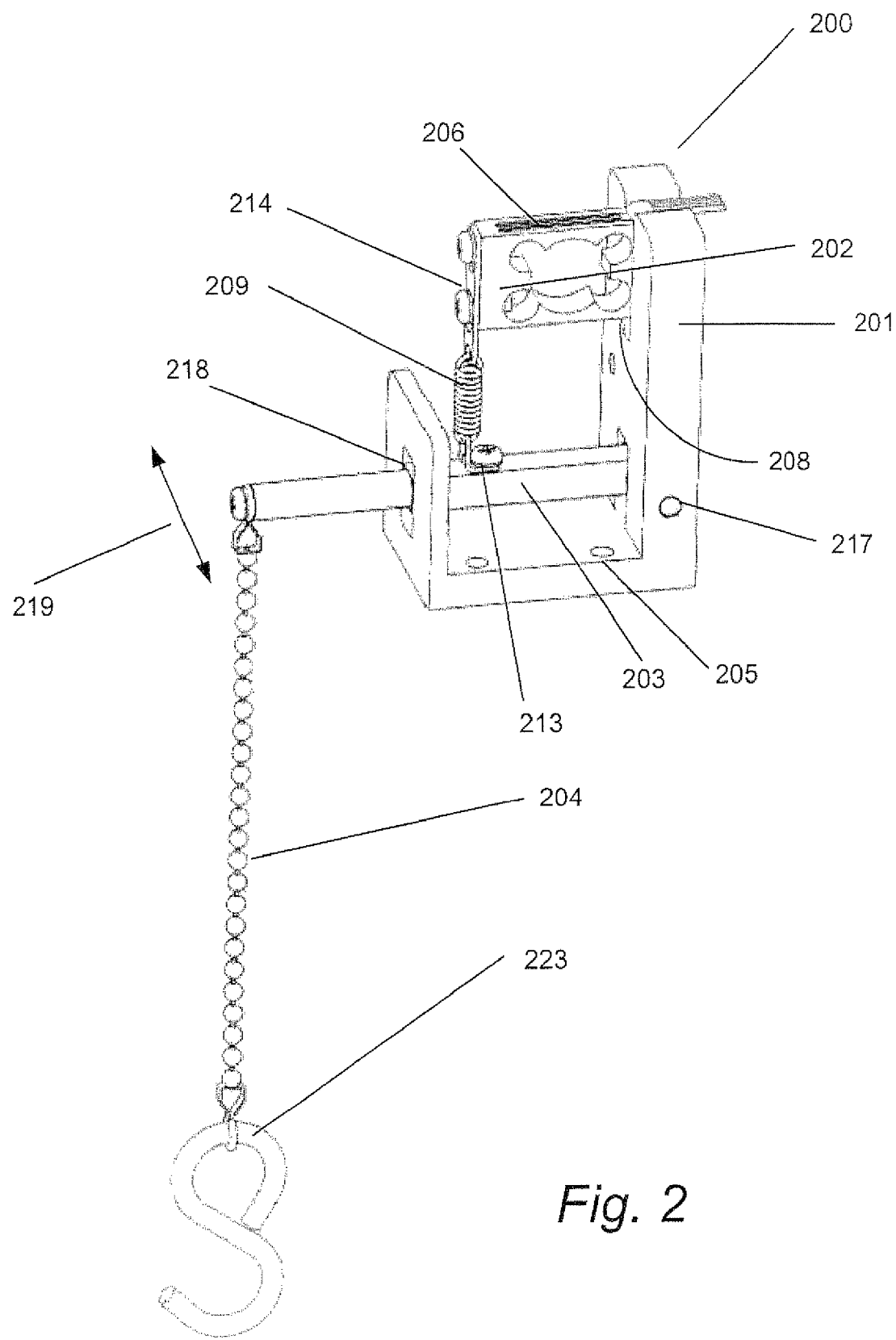
FIG. 2 is an assembled diagram of the weight scale.

FIG. 2 shows an isometric drawing of the weight scale 119 assembly 200. The assembly comprises a support housing 201 with an attached load cell 202 and a scale beam 203. The load cell may have a rectangular shape with a center cutout 1209, and a strain gauge 206 attached to an edge of the cell. A hook 223 and chain 204 are attached to the scale beam 203 to provide a flexible and easy to use coupling between the weight scale 119 and ultrafiltrate bag 113. The support housing is attached to a base plate inside of the ultrafiltration device by screws that extend through bores 205 on the base of the support housing. The load cell 202 is of the strain gauge 206 is a Whetstone bridge construction formed as a sputtered thin film strain gauge. The load cell 202 is attached to the support housing 201 via two keps screws 207 and is recessed in a machined groove 208 to ensure alignment of the load cell during assembly.

The load cell may be permanently deformed if strained by an excessive displacement, such as greater than 0.01 inches. Permanent deformation of the load cell may result in a permanent offset to the strain gauge and could improperly bias the output of the gauge. To prevent a permanent deformation, the load cell is shield from excessive forces by being housed inside of the pump console and attached to the collection bag via a tension spring 209 that connects the proximal end of the load cell 202 to the scale beam 203. The tension spring prevents excessive force from being applied to the load cell 202 by the beam 203.

The scale beam 203 is attached to the support housing 201 via a steel pin 211 which is a fulcrum 217 for the beam. Two polymer washers 212 slide on the pin 111 on either side of the scale beam 203. The washers center the scale beam and prevent metal to metal contact and reduce friction between the pivoting beam and housing 201. The beam is attached to the load cell 202 via the spring 209 which is attached to a right angle eyelet 213 on the scale beam 203 and an eyelet 214 on the load cell 202. The eyelet 214 on the load cell has slide holes 215 to allow for some adjustment of the beam height during assembly. Both eyelets 213, 214 are attached via keps screws 216 and 230. The spring 209 allows for an increase in beam 203 travel, facilitates low cost tolerances. The spring stiffness is chosen based upon the displacement tolerance requirement for the beam. As weight, e.g. fluid to the collection bag, is added to the scale, the beam 203 lowers and pivots about its fulcrum 217. The beam displacement stretches the spring 209. A rectangular bore 218 on the proximal end of the support housing 201 provides end stops for the beam displacement. The bore also provides overload protection in the loaded and unloaded position of the beam. The bore also stops the beam if someone tugs the scale chain 204 laterally 219. If the beam is pushed inwards towards the distal end of the support housing 201 or pulled forwards away from the proximal end of the support housing the steel pin 211 prevents overload of the load cell. Accordingly, bore 218 and pin 211 provide structural stops for all directions of beam 203 movement.

Figure 3:
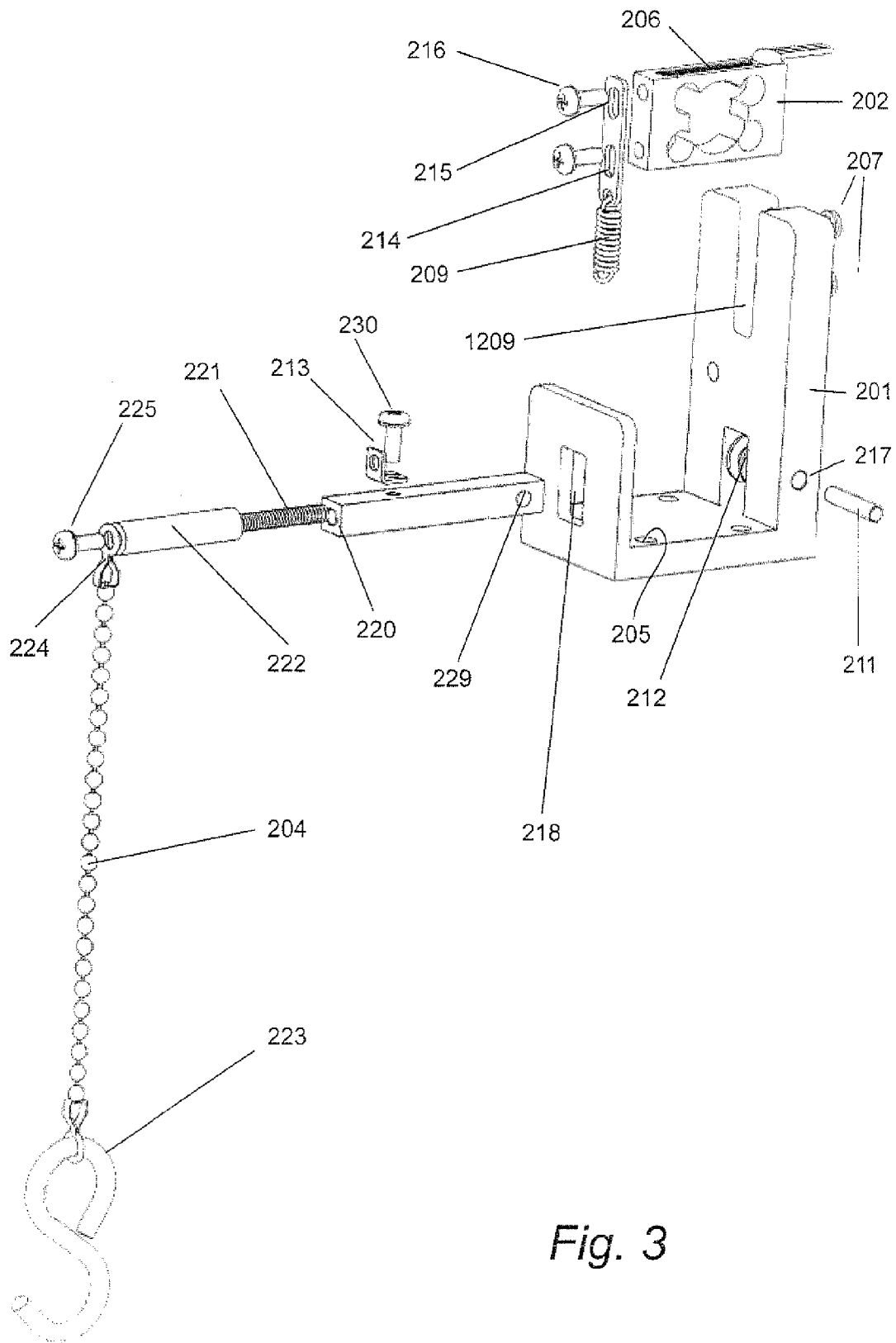
FIG. 3 is an exploded diagram of the weight scale.

FIG. 3 shows an exploded isometric drawing of the weight scale assembly 200. The eyelet 214 is attached to the load cell 202 and the load cell is attached to the support housing 201 with keps screws 207. During assembly it is possible to adjust the angle of the weight scale beam 203, such as to ensure that all beams are at the same angle under a no load condition by sliding the eyelet bar 214 up or down using the keps screws 216 as guides in the slots 215 provided in the eyelet bar 214.

The steel pin 211 which acts as the scale fulcrum passes through a bore 217 in the support housing 201, a friction preventing washer 212, a bore in the scale beam 219, another friction preventing washer 212 and a blind bore on the opposite slot side of the fulcrum slot of the support housing. The scale beam 203 may be formed of an aluminum bar with a bore 229 at a distal end of the bar for the steel pin 211; right angled eyelet plate 213 for connection to the tension spring 209; a threaded bore 220 through the center of the proximal end of the aluminum bar 203 for connection to a threaded rod; a threaded rod 221; a polymer rod 222 to provide electrical isolation to the patient and user from the device; a ball chain 204 attached to the polymer rod 222 with a ring connector 224 attached with a screw 225, and a hook 223 for a fluid collection bag at the end of the chain. The screw 225 bottoms out on a blind hole in the polymer rod 222 and allows the chain 204 and ring connector 224 to swivel on the screw by providing a small clearance gap between the head of the screw and polymer rod.

Figure 4:
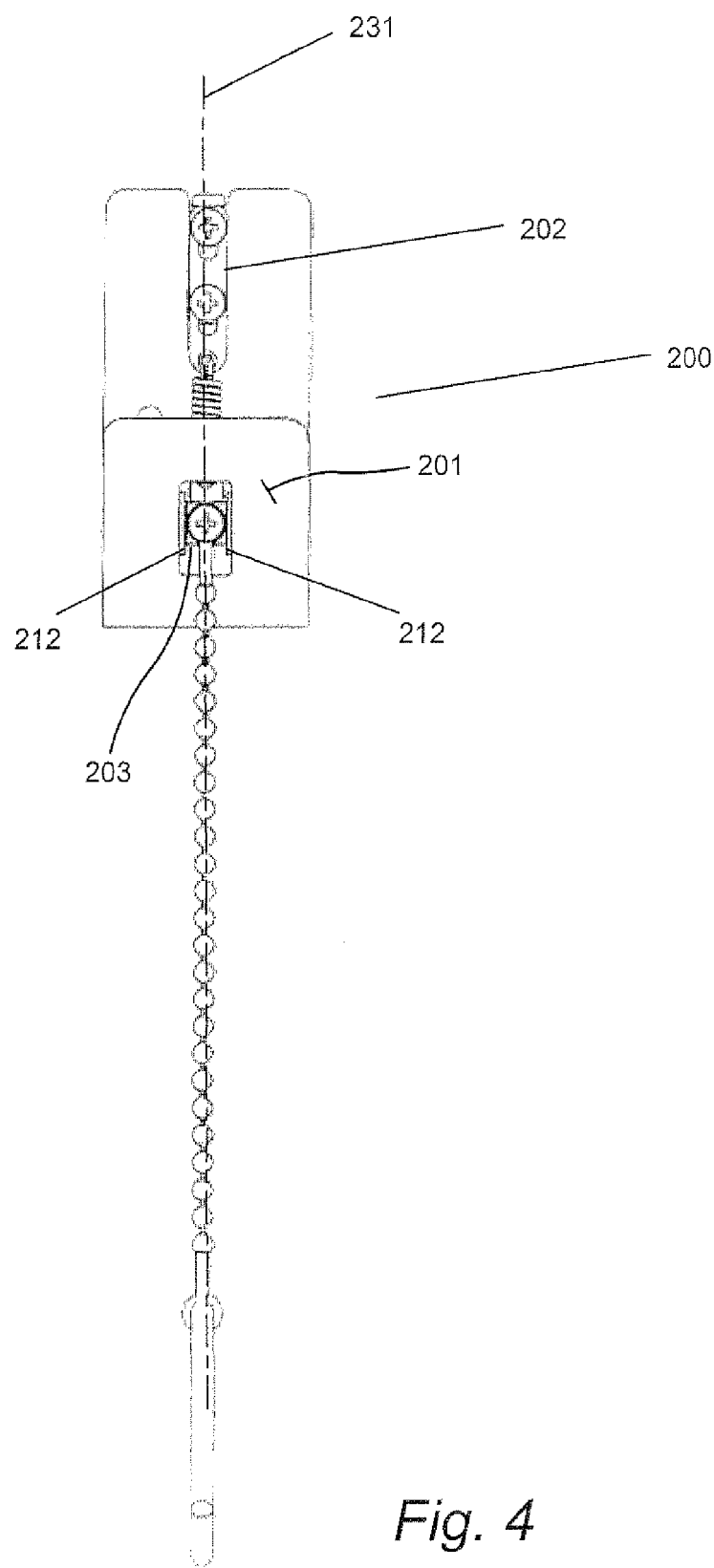
FIG. 4 is a end view of the weight scale.

FIG. 4 shows an end view drawing of the proximal end of the weight scale 200. The load cell 202 is aligned in the vertical center plane 231 of the scale beam 203, spring 209 and hook 223. The polymer washers 212 are position on the pin 211 between the support housing 201 and scale beam 203 to reduce friction as the beam rotates about its fulcrum.

Figure 5:
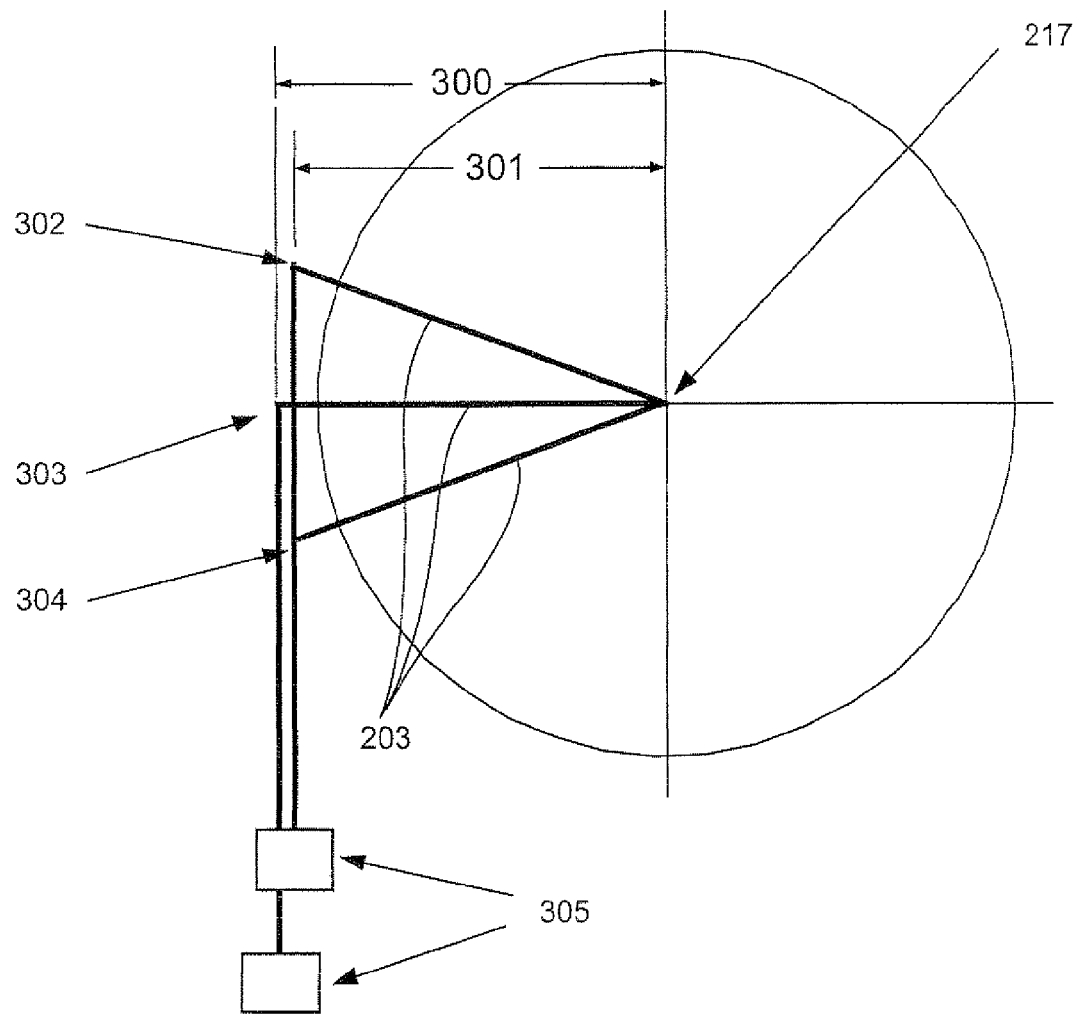
FIG. 5 is a diagram of the change in length of the scale the scale beam arcs about its fulcrum.

FIG. 5 is a diagram illustrating how the effective length 300 and 301, i.e., the horizontal component, of the scale beam 203 increases as the beam moves from initial (unloaded) position 302 to partially loaded position 303. The effective length of the beam decreases as weight is added and the beam moves to fully loaded position 304. The variation in the effective length of the beam makes the theoretical measurement of weight nonlinear with respect to the voltage output of the Whetstone bridge output of the load cell. The scale is calibrated during the manufacturing process with 0 kg to determine an offset and with a 1 kg calibration weight. The analog to digital input to the system processor for the device 100 is read at each weight and a linear fit is used to determine the gain and offset of the weight scale. These calibration constants are stored in non-volatile memory of the ultrafiltration device 100 to be read upon power on. The weight scale beam 203 is adjusted using the load cell eyelet 214 to have a positive angle of 2 to 4 degrees under no load. The scale is designed to measure a maximum rated weight without the beam 203 reaching the end stop of the rectangular bore 218. The maximum rated weight may be greater than 1.6 kg but less than 2.0 kg. During normal operation the weight scale is loaded with weights between 0.0 kg and 1.0 kg. The spring stiffness may be selected such that the maximum rated weight, e.g., 1.0 kg, to be applied to the weight scale displaces the beam 203 such that the beam does not yet hit the bottom edge of the bore 218. The beam may not hit the bottom edge of the bore until the weight applied to the scale is substantially greater than the rated weight. For example, the spring stiffness may be chosen such that the beam will bottom against the base edge of the bore if loaded with weights above 1.6 kg, whereas the maximum rated weight is only 1.0 kg.

The accuracy of the weight measurement may be improved by compensating for the non-linearity of the strain gauge Wheatstone voltage output due to the arc movement of the scale beam 203. An electronic lookup table may be stored in the processor and used to correlate the strain gauge readout signals to an accurate measurement of the weight of the filtration bag applied to the beam. The lookup table may be generated during the development of weight scale by applying several know weights to the beam and using the scale to measure the known weights. With a know weight applied to the beam, an error can be determined by comparing the known weight to the weight readout derived from the amplified output voltage of the Whetstone bridge using a liner model transfer function. The lookup table may be populated with the measurement error for various ranges of weights, were each weight range corresponds to each of the know weights applied to the beam. For example, known weights of 0, 20, 30, 100, 200, 300, 500, 800, 1000, 1200 and 1500 grams may be attached to the weight scale and the average error measured for each weight assessed. The load table is loaded in the processor during manufacture. In addition, the weight scale for each pump console may be calibrated, e.g., at 0 kg and 1 kg, as is described below. During operation, the processor may use the lookup table and the weight scale signal output to calculate a corrected weight measurement.

A error compensation lookup table, see Table I, is generated to linearize the effect of the nonlinearity of the arc motion of the beam and improve weight measurement accuracy.

TABLE I

| Weight | Counts | Calibration | % Error | Kw |
| --- | --- | --- | --- | --- |
| 0 | 0 | 0.00 | 0.00 | 0.0000 |
| 10 | 24 | 10.36 | 3.50 | 0.9650 |
| 20 | 48 | 20.73 | 3.50 | 0.9650 |
| 30 | 72 | 31.09 | 3.50 | 0.9650 |
| 100 | 241 | 103.84 | 3.70 | 0.9630 |
| 200 | 480 | 207.25 | 3.50 | 0.9650 |
| 300 | 718 | 310.02 | 3.23 | 0.9677 |
| 500 | 1186 | 512.09 | 2.36 | 0.9764 |
| 800 | 1871 | 807.86 | 0.97 | 0.9903 |
| 1000 | 2316 | 1000.00 | 0.00 | 1.0000 |
| 1200 | 2746 | 1185.66 | −1.21 | 1.0121 |
| 1500 | 3346 | 1444.73 | −3.83 | 1.0383 |

The five columns of Table I are: Weight is the calibration weight attached to the scale with an accuracy of +/−0.01 grams; Count is the average difference in counts output from the analog to digital converter (ADC) coupled to the amplified output voltage of the Whetstone bridge minus the offset count for a given weight; each weight scale is calibrated to give the have the same offset and gain by electrical adjustment of the amplifier gain and offset for 0 grams and 1000 grams; Calibration is the uncorrected measured weight (which would be an accurate measurement if the ultrafiltration device had a linear relationship between the ADC output and the weight applied to the weight scale); Percent (%) Error is the error in the uncorrected measured weight assuming a linear model/transfer function, and Kw is the correction factor required for a given weight to linearize and correct the measured weight. For example, a 100 gram weight would measure 3.7% high by displaying as 103.84 grams as the uncorrected measured weight (and assuming the correction factor (Kw) is not applied to the measured weight readout). Compensation factors Kw were generated for each of weights measured to increase accuracy and these nominal correction factors are stored in the software code as constants. In one example, the compensation factor Kw improves the accuracy of the weight scale to within two grams over the full operational range of 0 to 1000 grams from a possible error of +/−25 grams in the assembly described.

The algorithm set forth below describes how a correction is applied to the uncorrected weight measurement output of the weight scale:

$$Wlinear = (Cweight - Offset) * Gweight$$

$$Wdisplayed = Wlinear * Kw$$

Where Wlinear is the weight calculated using a linear model and corresponds to column 3 in Table I; Wdisplayed is the compensated and accurate weight; Cweight is the ADC count read from the weight scale analog to digital converter; Offset is the ADC count stored in non volatile memory of the of the ultrafiltration device at the time of calibration; Gweight is the gain stored in non volatile memory of the weight scale assuming a linear relationship at the time of calibration, and Kw is the interpolated correction factor using the nearest weight above and below the calculated nonlinearized weight Vweight in the weight look up table stored in the system software code. The Offset may be determined during manufacturing for each weight scale by measuring the ADC count without any weight applied. The gain of the weight scale may be determined during manufacturing by applying a known weight, e.g., 1 kg, to the beam and measuring the ADC count and storing the resultant number of the attached calibration weight divided by the sum of the ADC count with the calibration weight attached minus the offset ADC count without any weight attached. Both the gain and offset values are then stored in non volatile memory of the ultrafiltration device. The resultant weight calculated using this linear model, Wlinear is then used to calculate the interpolated correction factor Kw based upon the weight in the Table I under the column calibration.

Figure 6:
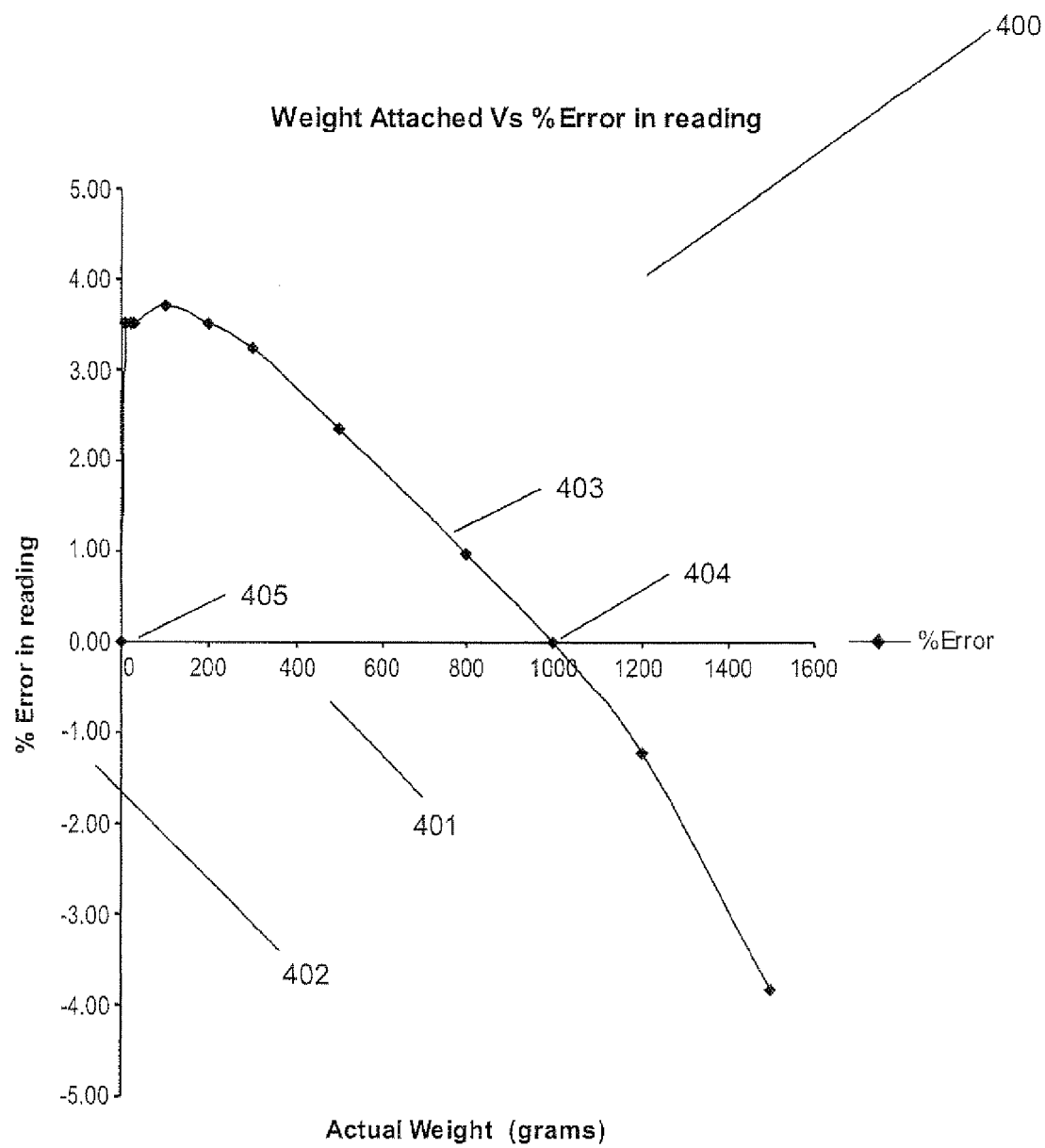
FIG. 6 is a graph of the weight verses percent error assuming a linear model.

FIG. 6 is a chart illustrating the percent error in the uncorrected weight measurement 400, before the measurement is corrected to account for nonlinearities of the weight scale. The x axis 401 is the calibration weight, and the y axis 402 is the percent error between the actual calibration weight and the calculated weight Wlinear, using a linear model. For weights less than 300 grams, the Percent (%) Error may be as high as 3.5%. The error at weights of 0 gram 405 and 1000 gram 404 are established as zero because these were the calibration weights. The error trace 403 has a generally linear slope and a linear approximation is appropriate to estimate the error correction factor (Kw). The function of the correction factor Kw is to make the correction necessary to account for this error in linear model Wlinear, so that if the error was displayed for Wdisplayed it would ideally be 0%.

Figure 7:
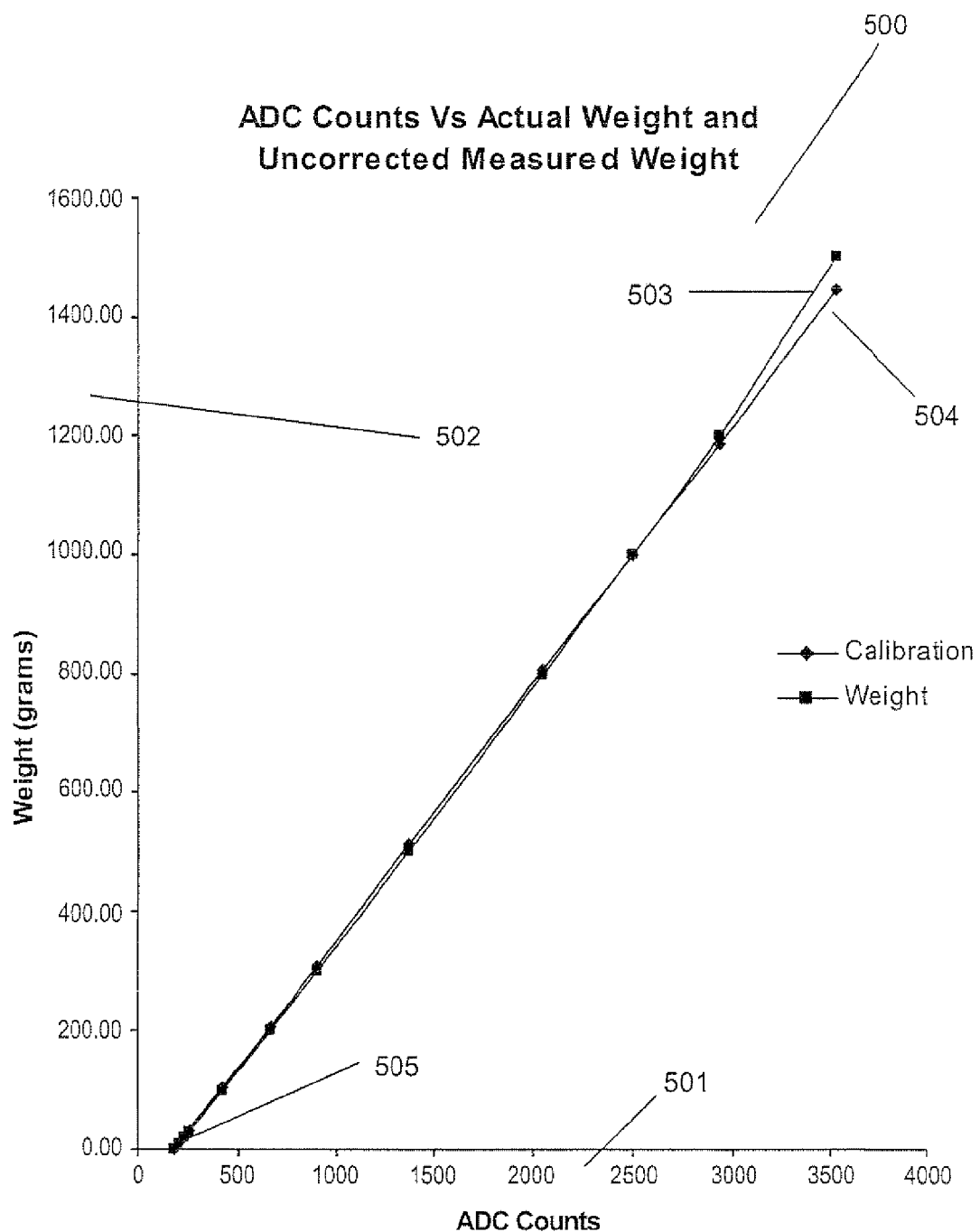
FIG. 7 is a graph of ADC counts verses the actual weight and the uncorrected measured weight assuming a linear model.

FIG. 7 is a chart that compares the output ADC counts 501 of the measured weight 504 using the linear model Wlinear, of the gain and offset stored in nonvolatile memory to the know weight of the attached calibration weights 503 for a single scale. The x axis 501 shows the ADC counts, the y axis 502 shows the weight in grams. An offset 505 of, for example, 184 counts is applied to all ADC counts. The amount of offset may vary for each weight scale or scale design. The uncorrected calculated weight is derived from the ADC counts 504 using a linear model, Wlinear. For example, if a 100 gram weight is applied to the weight scale, the ADC would output 425 counts. Gweight was calculated to be 2.316 at the time of calibration using the 1000 gram weight.

$$Wlinear = (425 - 184) / 2.316 = 104 \text{ grams}.$$

Where Wlinear is the weight measured using a linear model. Kw may now be calculated based upon the Calibration column and Kw column. Table II below shows the data stored in ultrafiltration device code. This is the only data necessary for performing the linearization of weight scale.

TABLE II

| Calibration or Wlinear | Kw |
| --- | --- |
| 0.00 | 0.0000 |
| 10.36 | 0.9650 |
| 20.73 | 0.9650 |
| 31.09 | 0.9650 |
| 103.84 | 0.9630 |
| 207.25 | 0.9650 |
| 310.02 | 0.9677 |
| 512.09 | 0.9764 |
| 807.86 | 0.9903 |
| 1000.00 | 1.0000 |
| 1185.66 | 1.0121 |
| 1444.73 | 1.0383 |

The following Table III shows the data required to perform the interpolation based upon Wlinear being measured as 104 grams:

TABLE III

| X | Kw | Y | Calibration |
|---|---|---|---|
| $x_1$ | 0.963 | $y_1$ | 103.84 |
| $x_2$ | 0.965 | $y_2$ | 207.25 |

$$Kw=(x_2-x_1)*(104-y_1)/(y_2-y_1)+x_1$$

$$Kw=(0.965-0.963)*(104-103.84)/(207.25-103.84)+0.963$$

$$Kw=0.963003$$

$$Wdisplayed=Wlinear*0.9630003$$

The Wdisplayed is the corrected weight and equals 100.2 grams. Thus an inaccuracy of 4 grams using only a linear model can be decreased to 0.2 grams by accounting for the nonlinearity of the weight scale. If a weight of less than 0 grams is calculated for Wlinear, Kw for 0 grams is used and if a weight greater than 1444.73 is calculated for Wlinear Kw for 1444.73 is used.

An alternative to using a look up table as described above would be to use a polynomial fit but the method described has the advantage of requiring only 1 calibration weight and a knowledge of how the arc movement of the weight scale beam will affect linearity. Characterizing this nonlinearity once during the design process has the advantage of minimizing the number of weights to one required by the service or manufacturing person, deskilling the operation while still attaining highly accurate and repeatable weight measurements. The alternative would be to use a series of weights for calibration during manufacturing and service and to store the resulting values in nonvolatile memory. This would add unnecessary cost and complication to the calibration procedure for manufacturing and service personnel.

Figure 8:
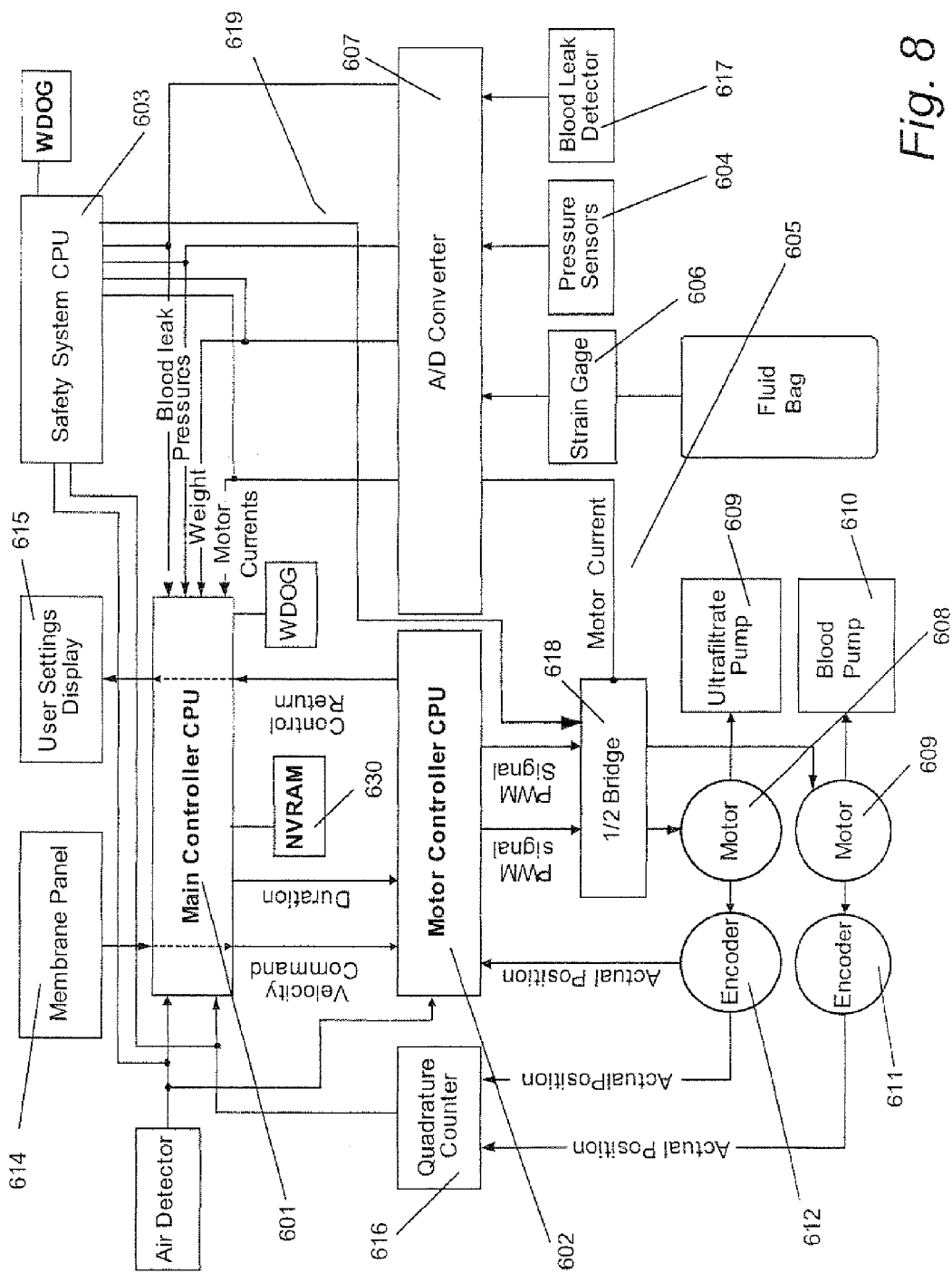
FIG. 8 is an overview of the electrical layout of the ultrafiltration device.

FIG. 8 is an overview of the electrical layout of the ultrafiltration device. The ultrafiltration device 100 (FIG. 1) uses 3 processors in the control and monitoring of ultrafiltration removal. The main controller CPU 601 accepts user input from the membrane panel 614 and shows the user inputs on a display 615. The main controller CPU interfaces to the motor controller CPU 602 via a parallel bus and instructs the motor controller CPU to control the motor at a set velocity, acceleration and displacement. The motor controller use the quadrature counters which read the quadrature signals output from the encoders 612 and 611 attached to motors 608 and 609 and peristaltic pumps 609, 610 as feedback in the control of motor velocity. The encoders are also connected to a separate quadrature counter 616 which independently read by the main controller and the safety system CPU 603. The safety system CPU and main controller interface to ADC 607 and are capable of reading the withdrawal, infusion and ultrafiltrate pressure sensors 604, the motor currents 605, the weight 606 of the ultrafiltrate bag and the blood leak detector 617. The safety system CPU is capable of disabling (see line 619) the ½ bridge drive 618 to the motors 608, 609 which cut the voltage drive to the motor. The calibration constants for the device including the weight scale offset and gain are stored in non volatile memory (NVRAM) 630.

Figure 9:
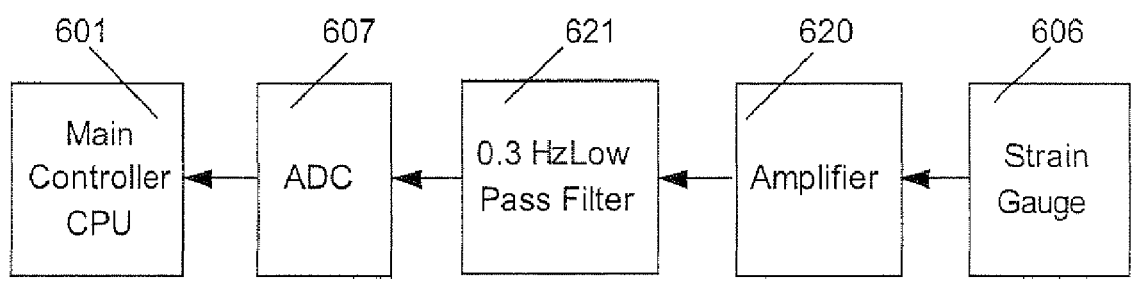
FIG. 9 is a diagram of the electrical interface between the main control processor and the weight scale.

FIG. 9 shows a more detailed diagram of the electrical amplification circuit for the strain gauge 606. The voltage output from the strain gauge 606 is amplified with an instrumentation amplifier 620; the amplified signal is filtered with a 2 pole low pass filter with a cut off frequency of 0.3 Hz 621; this filter output voltage is read by the ADC 620 via the main controller CPU 601.

Figure 10:
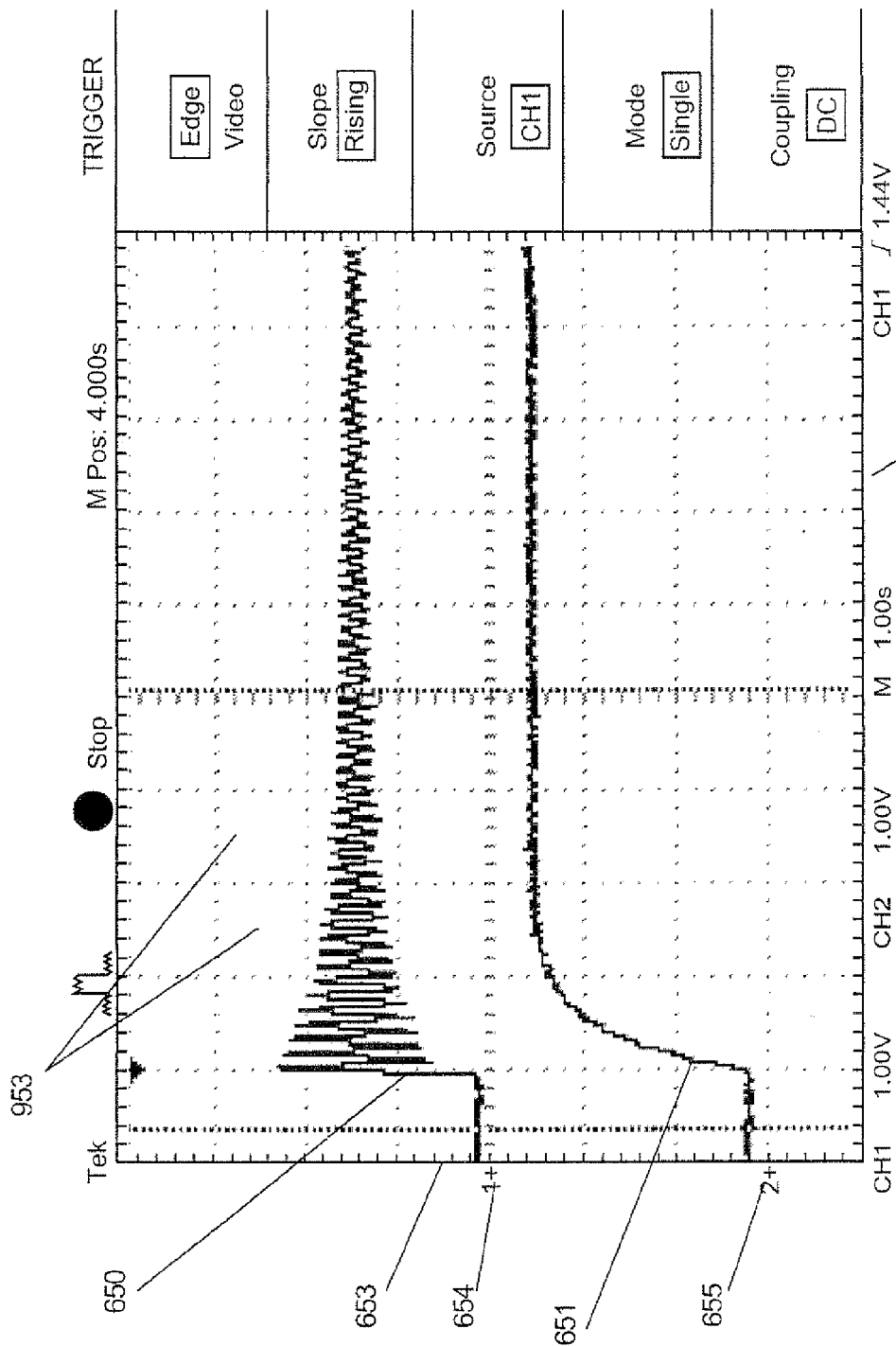
FIG. 10 is a graph captured by an oscilloscope of the amplified unfiltered weight scale output voltage when perturbed with a step input of a 1 kg weight being suddenly applied to the weight scale compared to the 0.3 Hz 2 pole low pass analog hardware filtered output of the same step input.

FIG. 10 shows the effect of a step input in weight to the strain gauge output signal. This data was collected using a using a Tektronix oscilloscope. The y-axis 653 shows the voltage output read by the oscilloscope and the x-axis 652 shows the time in increments of seconds. Each grid line represents a second on the x-axis. A 1 kg weight was suddenly applied to the weight scale and the resultant outputs for the unfiltered output 650 and the filtered output 651 were collected. Trace 650 shows the unfiltered output coming from the amplifier 620 and trace 651 shows the filtered output read by the ADC 607 from the output of the hardware 0.3 Hz low pass 2 pole filter 621. Points on the y-axis denoted by 654 for trace 1 650 and 655 for trace 2 651 represents ground for each of the trace signals. With a step input generated by the perturbation of applying a 1 Kg weight to the weight scale, the weight scale oscillates at its natural frequency of 5.6 Hz. The frequency or frequencies at which an object tends to vibrate with when hit, struck, plucked, strummed or somehow disturbed is known as the natural frequency of the object. The natural frequency will increase as weight is reduced, i.e. the ratio of spring stiffness to weight will increase. The 0.3 Hz filter 621 attenuates the amplified weight signal by averaging the high frequency pulsations. Similar pulsations and frequencies will occur when the device is moved exciting the weight scale at its natural frequency or the bag begins to sway in a pendulum motion.

Two basic forms of mechanical noise can interrupt the operation of the weight scale during operation and prevent it from displaying the correct weight measurement if they are not rejected:

1. The ultrafiltration device 100 FIG. 1.0 is moved and the weight scale beam oscillates at its natural frequency which results in displacement of the ultrafiltrate bag 113 FIG. 1.0 causing rapid increases and decreases in weight. The ultrafiltrate bag attached to the chain and hook may also act as a pendulum resulting in the simple harmonic motion of the bag swinging on the chain.

2. The ultrafiltrate bag is lifted momentarily by the operator to view the volume in the bag by examination of the volume bar increments printed on the side of the ultrafiltrate bag 113. This has been seen as a common clinical occurrence.

Both events will cause a standard CVVH system like the Gambro PRISMA to immediately alarm, and stop ultrafiltration and blood pump flow. When the ultrafiltration device 100 is moved it creates a perturbation in the weight scale measurement resulting in the measured weight oscillating about the actual measured weight. Thus if this oscillation at the natural frequency of the weight scale can be distinguished from a real alarm, this type of noise can be rejected and a false alarm can be prevented from annunciating.

The purpose of the weight scale is to determine that the set ultrafiltrate rate is being removed by the ultrafiltrate pump is within a specified accuracy level which is a limit set based upon patient safety, the limit has been set for this device at 30 ml. The weight scale acts as an independent sensor monitor for rate of ultrafiltration removal and provides an independent method of accessing the volume removed by the ultrafiltrate pump. The use of a weight scale also gives the ultrafiltration device the ability to detect a leak in the circuit between the ultrafiltrate pump and the weight scale. In the design of this ultrafiltration device a separate processor called the safety system CPU 603 FIG. 8.0 is also used to independently access the ultrafiltrate pump velocity which limits the maximum ultrafiltration rate to 600 ml/hr. If this limit is exceeded the safety system processor disables the motor amplifier ½ bridge 618 disconnecting electrical power being delivered to the motor thus preventing rotation of the ultrafiltrate pump 609. Patient safety can only be affected if:

1. The ultrafiltrate rate is greater than the fluid recruitment rate of the patient.
2. The patient is over dehydrated. The ultrafiltrate is collected in a one-liter ultrafiltrate bag 113 FIG. 1.0 suspended on the weight scale. If the ultrafiltrate tubing develops a leak or the ultrafiltrate pump rotates faster than it should, these fault conditions can be detected by the weight scale. Thus every time an additional 100 mL of fluid is extracted (as detected either by the integrated pump velocity or by the weight scale reading, whichever is reached first), the ultrafiltrate removal rate is checked. The main control processor compares the two calculated volume increments of the ultrafiltrate pump and the weight scale. If a mismatch of greater than 30 ml is detected, the ultrafiltrate pump is stopped and the user is notified by a weight scale mismatch alarm. When the one-liter in volume is reached, the ultrafiltrate pump is stopped and the user is notified via ultrafiltrate bag full alarm. In the event of the failure of the weight scale to detect the one-liter volume of fluid in the bag, the main control processor CPU will independently stop fluid removal when the integrated rotations of the pump add up to one-liter since start of treatment. The independent safety system CPU also examines the weight increase of the bag. When the weight of the bag exceeds 1300 ml for 1 minute and the ultrafiltrate pump has not been stopped by the main control processor CPU, the safety system CPU brings the device to a safe state by annunciating an alarm and disabling the motor drives.

Figure 11:
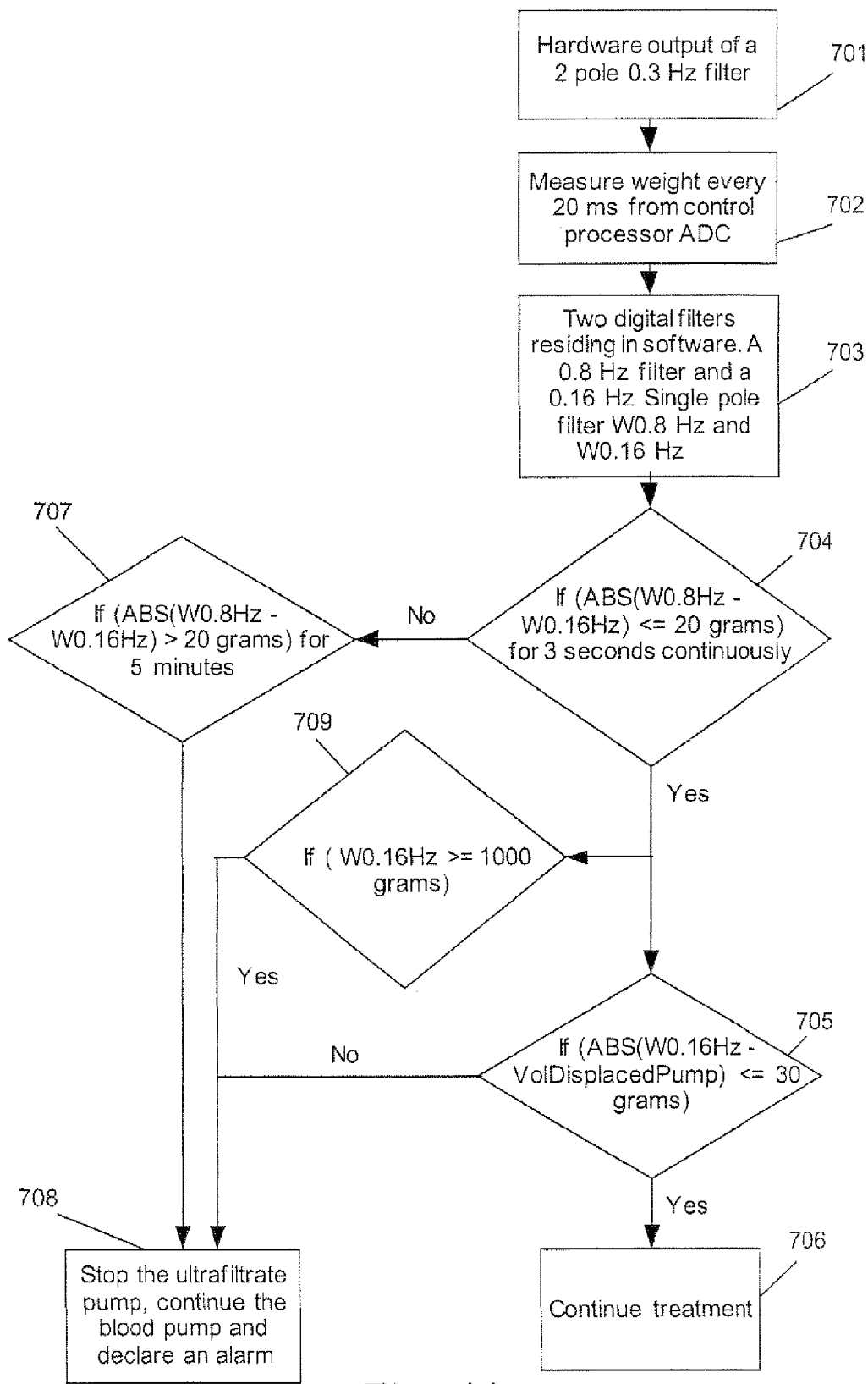
FIG. 11 is a flow chart of the weight scale noise rejection algorithm

FIG. 11 shows the flow chart diagram for the ultrafiltration device software to differentiate between false weight scale alarms and real alarms. The strain gauge hardware amplification circuit uses a 2 pole filter low pass filter with a 0.3 Hz cut off frequency 701 to dampen fluctuations in weight. This output is then measured every 20 ms using an ADC interfaced 702 to the main control processor. The scaled ADC count is converted to a weight measurement based upon the gain and offset stored in nonvolatile memory and passed through two first order digital low pass filters in software 703. One low pass filters having a 0.16 Hz cut off frequency and the other having a 0.8 Hz low pass filter are applied in step 707. The 0.8 Hz filter has little effect on the already filtered 0.3 Hz signal performed in hardware. Its purpose is to remove electrical noise if present. If the absolute difference of the two digital low pass filters reads less than or equal to 20 grams 704 of each other for 3 seconds when read at a 50 Hz sample rate, it means that there is no significant noise in the system and a stable measurement can be taken. The volume displaced by the ultrafiltrate pump integrated over the past 100 ml is compared to the weight increase seen by the weight scale (step 709) and if the absolute difference of the resulting value is less than or equal to 30 ml (step 705), no alarm is annunciated in step 706. If the absolute difference of the resulting value is greater than 30 ml an alarm for a weight scale mismatch is annunciated in step 708. If the absolute difference of the outputs of the two digital low pass filters 704 read greater than 20 grams of each other for 5 minutes a weight scale mismatch alarm is declared. At a maximum undetected ultrafiltrate rate of 600 ml/hr for a 5 minute period the limit used by the safety system processor it will result in a volume discrepancy of a 50 ml which is not significant in terms of dehydration in a patient.

When the ultrafiltrate bag is lifted by an operator the process of examination of the bag by the user normally takes less than 30 seconds. This is enough time for the dual low pass filters to stabilize and show an abrupt loss in volume as can be seen from trace 651 FIG. 10 where stabilization occurs in 4 seconds. Thus it would result in a false alarm if a separate algorithm were not used for this event. The software is constructed to avoid alarming for this event for a period of 30 seconds if the dual low pass filters match 704 but the weight scale does not match the integrated ultrafiltrate pump displacement. If the situation does not rectify itself within the expected 30 second time period a weight mismatch alarm will be annunciated by the ultrafiltration device alerting the user to a potential problem.

The weight scale can be accurately modeled as a standard second order transfer function as demonstrated by the step input in trace 650 FIG. 10 which means that as weight is added to the scale the wavelength of the oscillations will increase. Testing has shown that for weights of 100 grams, 500 grams and 1000 grams these oscillations will have frequencies of 16.5 Hz, 8.2 Hz and 5.6 Hz respectively. This means that worst case noise will occur at the lower weights because the hardware and software filtering will have less attenuation of the signal. For the purpose of demonstrating how the algorithm functions a mathematical model of the system was constructed and the robustness of the algorithms was tested as in the discussion of FIGS. 12 to 18.

Figure 12:
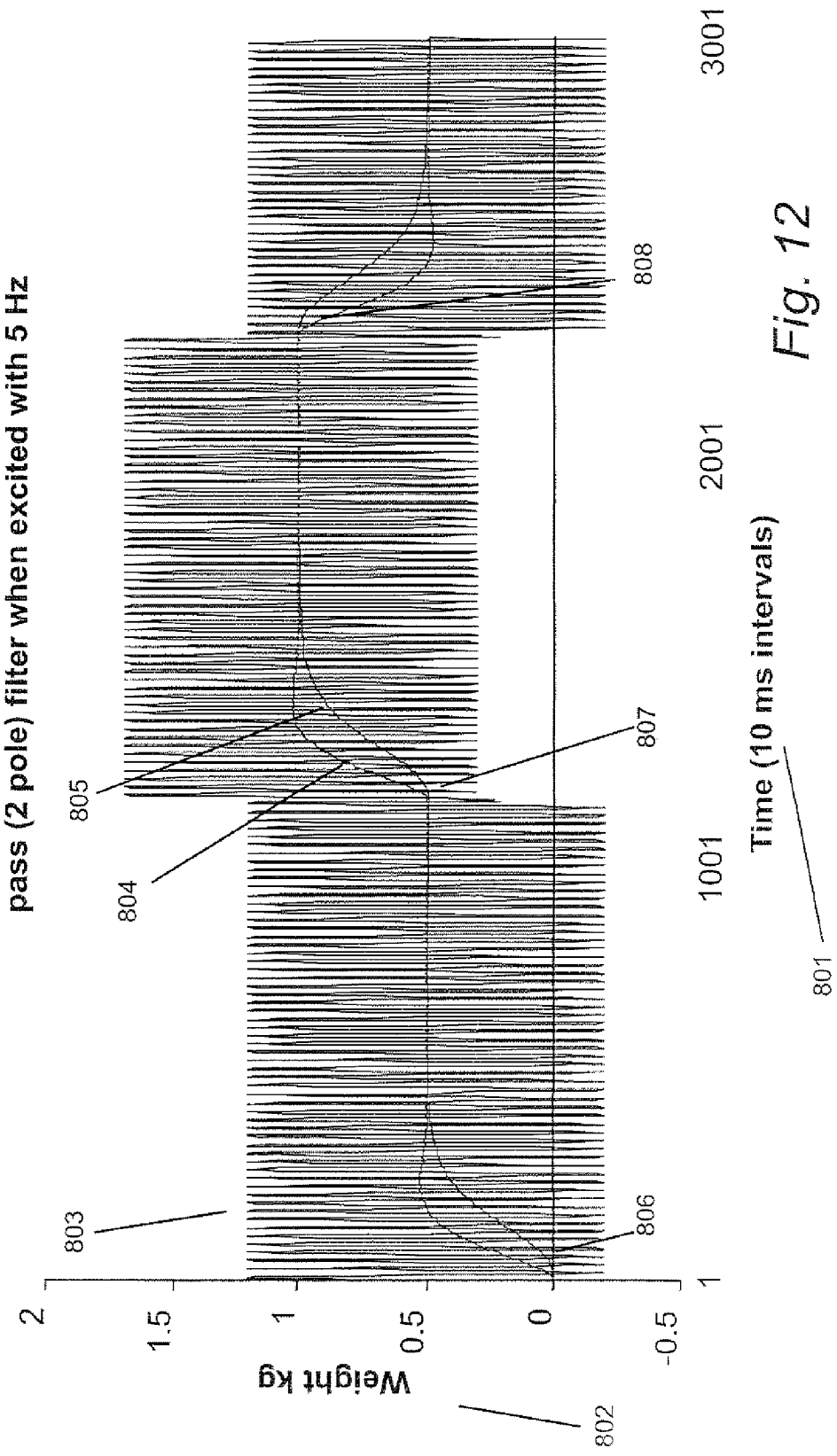
FIG. 12 is a graph of the difference in weight measured between a 0.16 Hz (single pole) and a 0.3 Hz low pass (2 pole) filter when excited with a constant 5 Hz sinusoidal frequency with a step input of 0 to 0.5 kg, 0.5 to 1.0 kg and 1.0 kg to 0.5 kg

FIG. 12 shows a graph of the difference in weight measured by the dual filters, a 0.16 Hz (single pole) 805 and a 0.8 Hz low pass filter 804 after passing through the 0.3 Hz low pass (2 pole) filter when the attached weight to the beam is excited with 5 Hz oscillatory load 803. The x-axis 810 shows time in increments of 10 ms, thus time increment 1001 indicates 1001×10 ms=10.01 secs. The y-axis shows weight in kg. The dual filters 804 and 805 were fed a sinusoidal input of 0.75 kg added to an average weight of 0.5 kg for the first 10 seconds 806 to 807 and a 1 kg weight for the next 10 seconds 807 to 808 and 0.5 kg for the remaining 10 seconds (times are approximate). The graph shows that even with an oscillation of 0.75 kg superimposed upon the true weight at a frequency of 5 Hz 803 which is the lowest natural frequency for an attached weight expected, both filters quickly settle. Thus, the filters adequately dampen the worst case oscillations from the weight scale due to its natural frequency.

Figure 13:
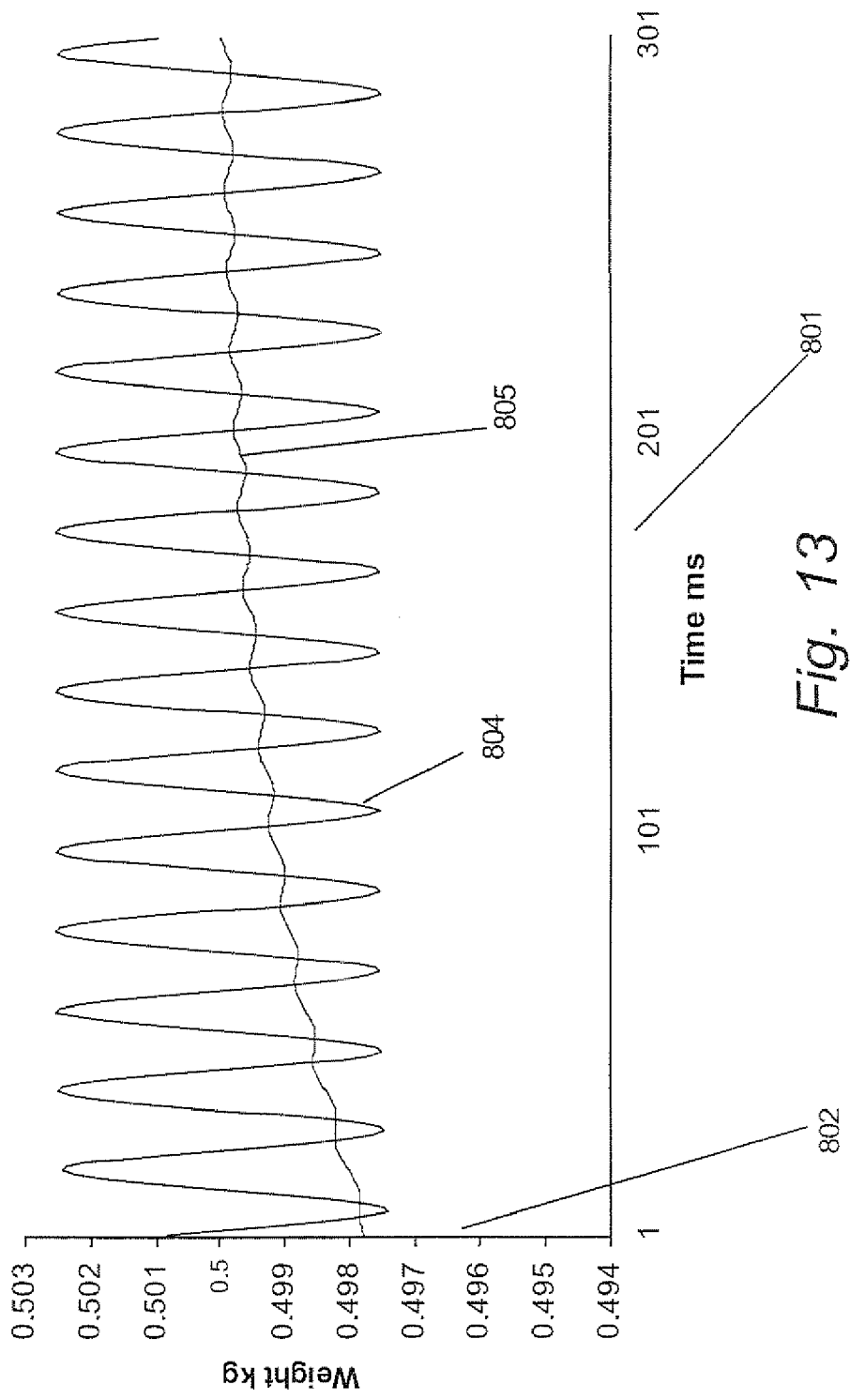
FIG. 13 is a close up of FIG. 11 in the 6 to 9 second time interval with the trace of the 5 Hz sinusoidal input removed for clarity.

FIG. 13 shows a close up of the outputs of the dual filters demonstrating that even with an oscillating load of 0.75 kg superimposed on the step input loads the maximum difference between filtered values is less than 4 grams once stabilized. This is very significant when we consider that a 20 gram tolerance is being used as the limit and that 0.75 kg is the maximum expected fluctuation. FIG. 10 trace 650 demonstrated that such a fluctuation would in reality quickly decay and not be continuous as in this mathematical model.

FIG. 13 shows a close up of the time zone of 6 to 9 seconds of FIG. 12. The input signal trace to the dual filters has been removed and the output signals of the 0.8 Hz low pass filter and the 0.16 Hz single pole low pass filter are displayed. The x-axis 801 shows time in 10 ms intervals and the y-axis 802 shows weight in kg. The 0.3 Hz 2 pole low pass filter which resides in hardware is mathematically modeled in this example and filters the 0.75 kg (height between average and peak) excursions at 5 Hz to oscillation of less than 0.0025 kg. The software digital filter 0.16 single pole low pass filter reduces these oscillations to less than 0.0005 grams which is less than the 12 bit resolution of the ADC.

Another form of perturbation is the pendulum motion of the weight attached to the scale chain and hook. This can be calculated using classical mechanics:

$$T = 2\pi \sqrt{\frac{L}{g}}$$

where T is the time period of the oscillation, L is the length of the chain fulcrum to the center of gravity of the bag and g is the acceleration due to gravity. The frequency of the pendulum motion can be calculated by:

$$F = \frac{1}{T}$$

Where F is the frequency in Hz and T is the time in seconds. From the time period T calculation it can be seen that the longer the length L, the smaller the frequency. Thus to calculated the smallest frequency a length of 406 mm (16 in) is used giving a Frequency of 0.78 Hz. Testing has shown that the bag will swing at a maximum angle from perpendicular of 10 degrees. This means that the weight measured by the weight scale can be off by 1.5% less than the actual weight due to angle of the chain created by the pendulum motion, 100(1−cos(10 deg)=1.5%.

Figure 14:
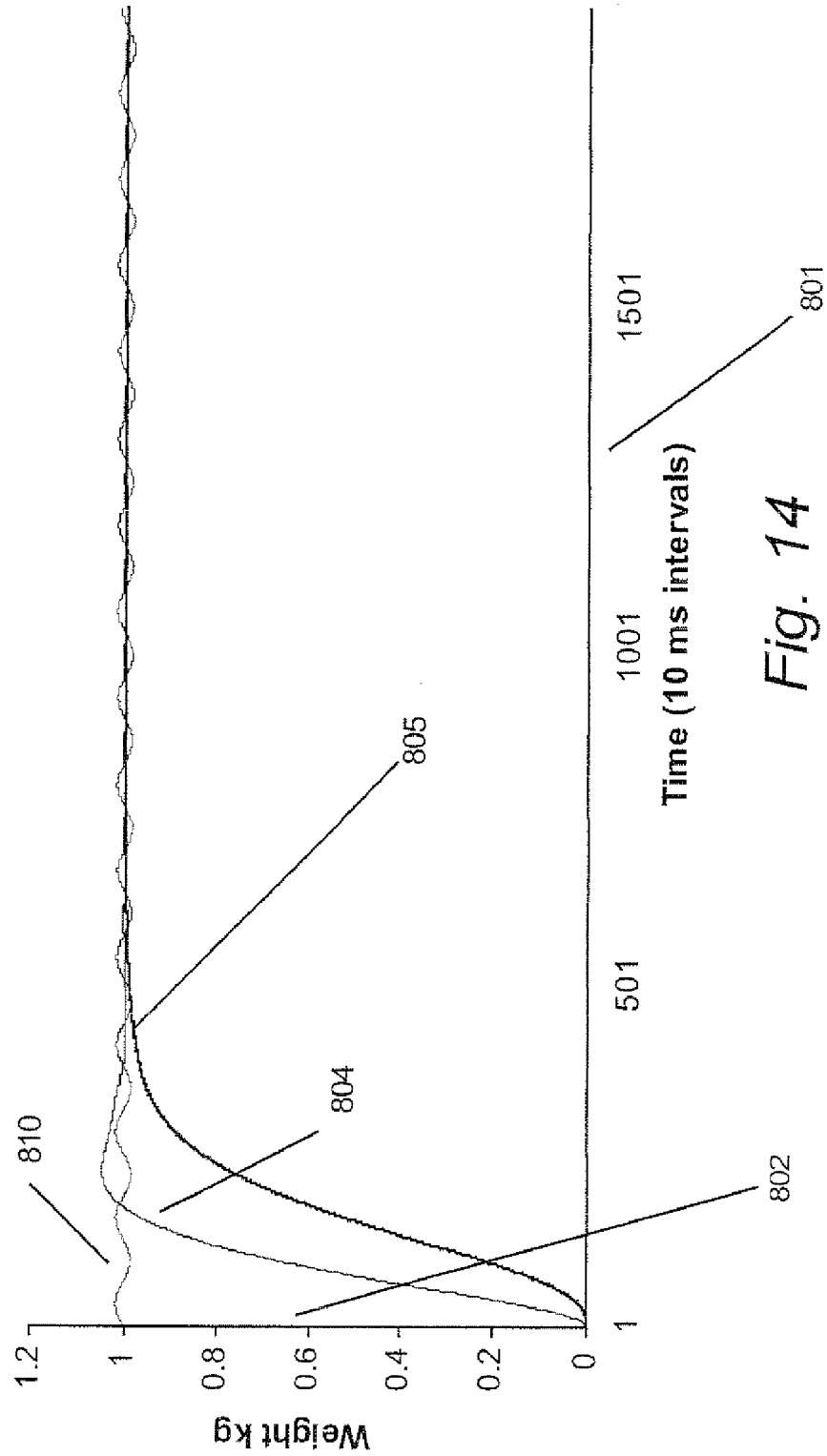
FIG. 14 is a graph of the unfiltered 0.87 Hz pendulum action of weight scale at a pendulum length of 106 mm filtered with a 0.3 Hz 2 pole low pass filter and a 0.16 Hz single pole low pass filter.

FIG. 14 shows how the dual filters will respond to a pendulum input. The x-axis 801 shows time in 10 ms intervals, the y-axis 802 shows weight in kg. The signal input to the dual filters is the output of the 0.3 Hz 2 pole low pass filter and is used as the signal input to the 0.8 Hz single pole low pass filter and the 0.16 Hz single pole low pass filter is the 0.78 Hz 15 gram oscillatory load 810 on a 1 kg weight simulating the pendulum motion of an ultrafiltrate bag. Both filters 804 and 805 quickly settle and dampen out the 1 Hz oscillations.

Figure 15:
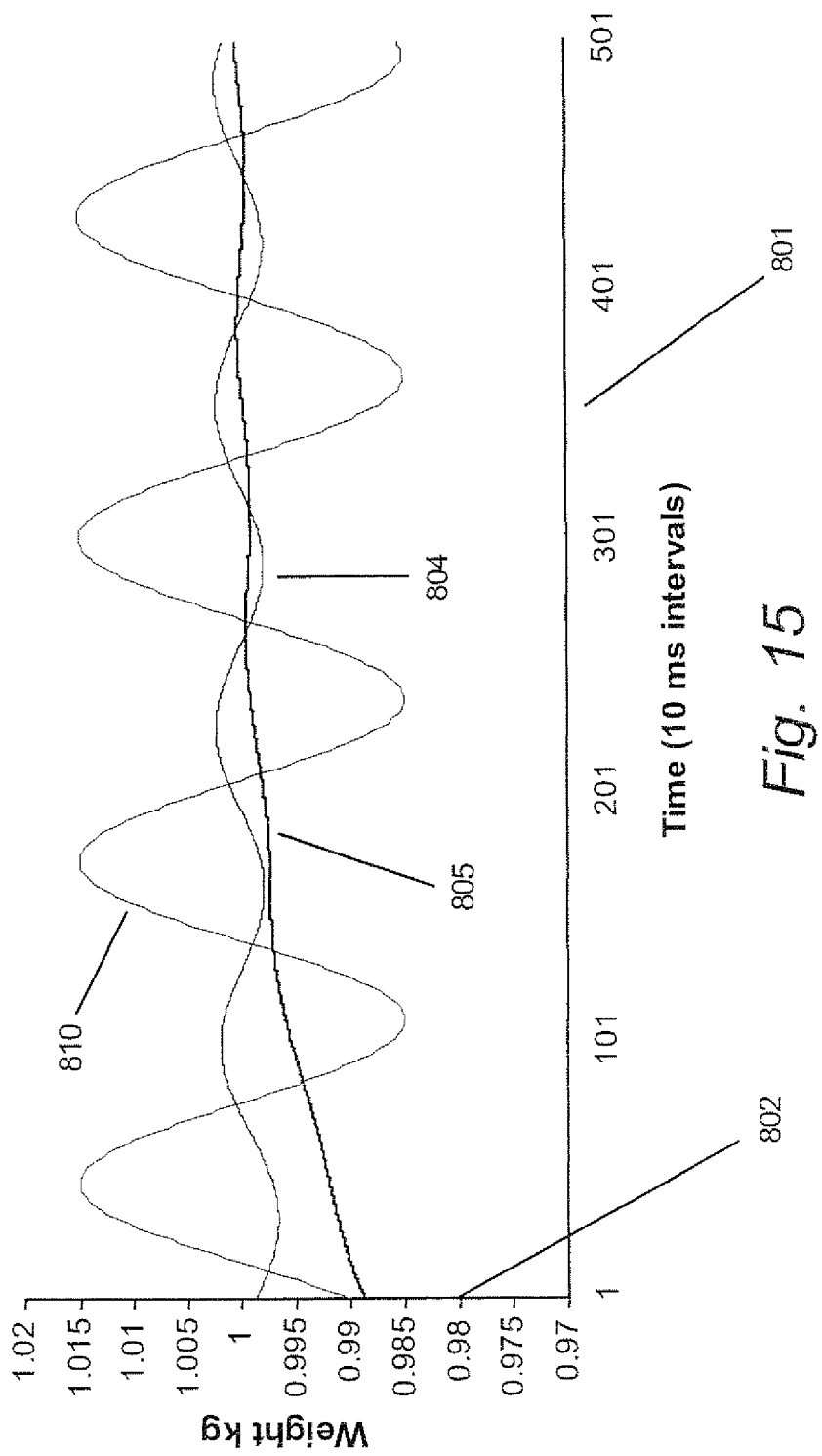
FIG. 15 is a close up of time segment 0.5 seconds to 1 seconds of FIG. 14.

FIG. 15 shows a close up of FIG. 14 in the 5 to 10 second range (500 to 1000 on FIG. 14). The x-axis 801 shows time in 10 ms intervals, the y-axis 802 shows weight in kg. The trace 805 the 0.16 Hz low pass filter shows that a 15 gram oscillation is attenuated to less than a gram. With much lower frequency oscillations the filters will no longer follow each other and the difference in phase lag become significant. This phenomenon makes it possible to distinguish between the expected constant oscillatory perturbations which can occur during ultrafiltrate device movement or occasional banging of the weight scale and real world alarm conditions.

Figure 16:
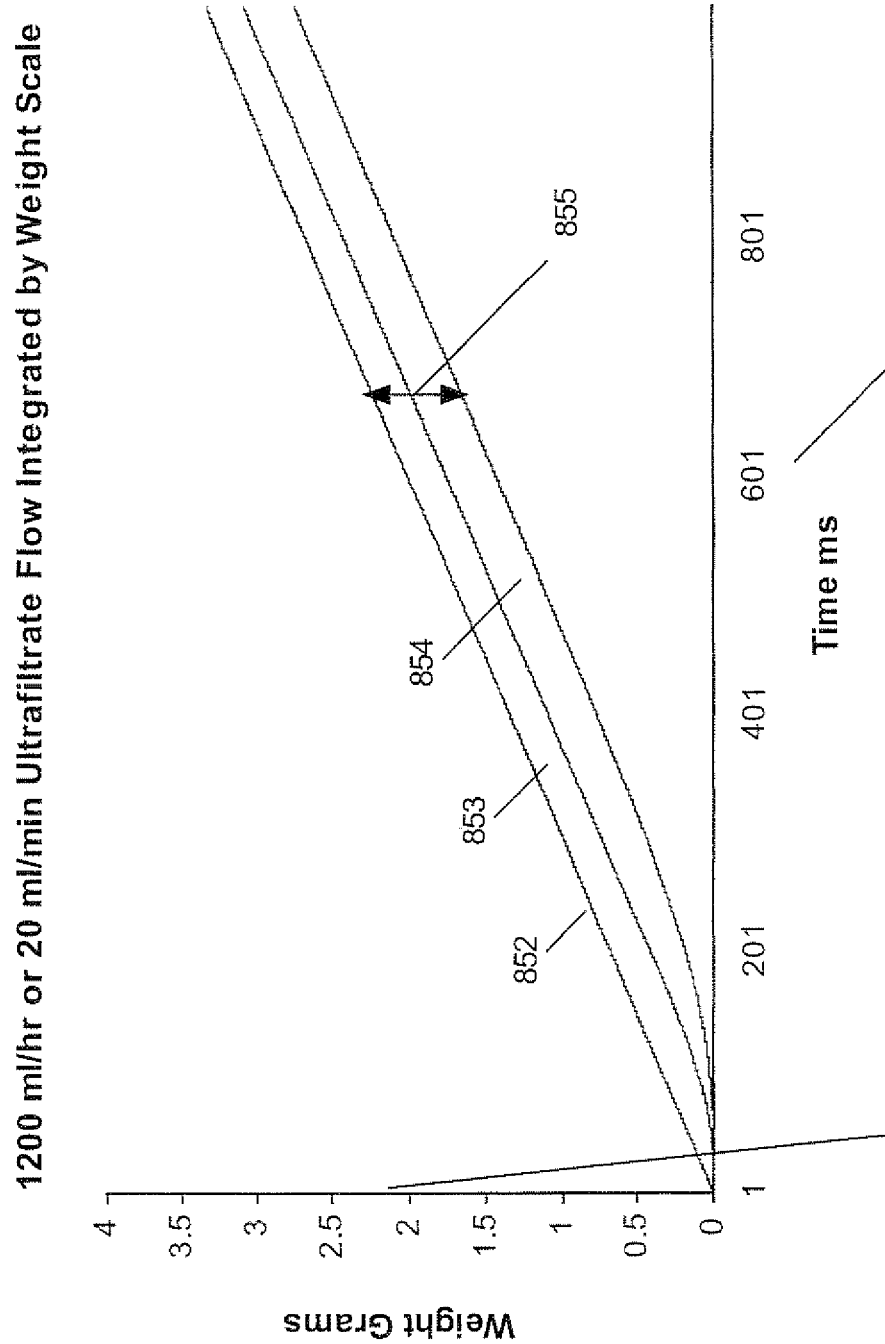
FIG. 16 is a graph of the difference response to weight measured between a 0.16 Hz (single pole) and a 0.3 Hz low pass (2 pole) filter when excited with 5 Hz.

FIG. 16 shows how the dual filters respond to a 1200 ml/hr weight gain. This is an ultrafiltrate flow rate outside of the allowable tolerance of the safety system CPU which has an upper limit of 600 ml/hr. Thus such an occurrence would be quickly stopped by the safety system CPU. The purpose of the graph is to show how little error is introduced by the lag of such filters. The x-axis of the graph 850 shows time in ms. The y-axis of the graph 851 shows the weight measured by the weight scale. The lag between the real weight 852 and the 0.16 Hz filter 854 is less than 0.8 grams 856. It should also be pointed out that this error can be accounted for because the lag the filter creates can be calculated as demonstrated 855 and algorithmically compensated for in software if an increased level of accuracy is required. The 0.8 Hz low pass filter is shown as trace 853 and the difference created by the difference in lag between filters is approximately 0.4 grams.

Figure 17:
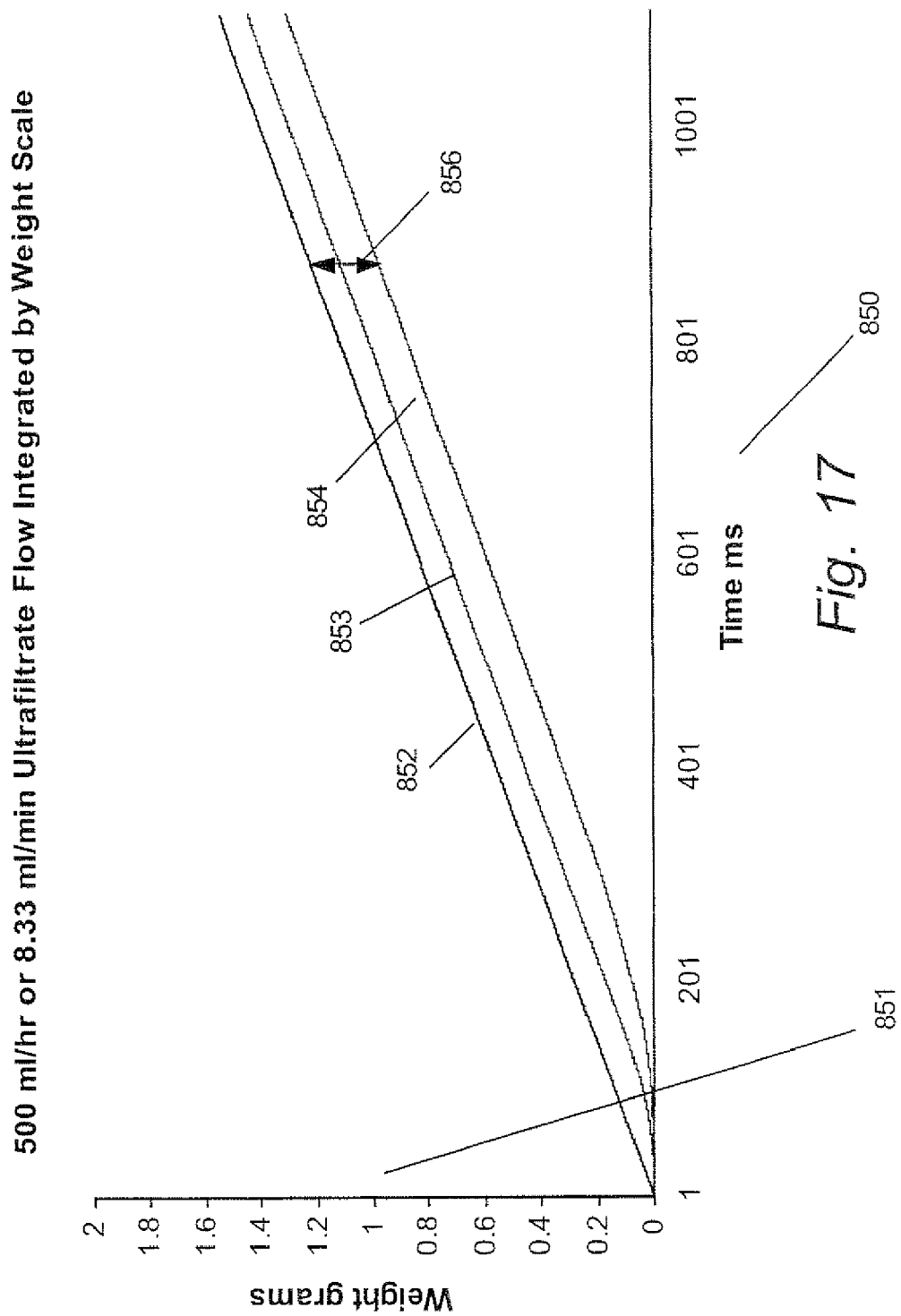
FIG. 17 is a graph of the response of the weight scale to an ultrafiltrate flow rate of 1200 ml/hr or 20 ml/min integrated showing the lag error in the dual low pass filters when compared with the unfiltered weight.

FIG. 17 shows a graph similar to FIG. 16 but this time the ultrafiltrate rate is set to 500 ml/hr. The x-axis of the graph 850 shows time in ms. The y-axis of the graph 851 shows the weight measured by the weight scale. The lag between the real weight 852 and the 0.16 Hz filter 854 is less than 0.4 grams 856. It should also be pointed out that this error can be accounted for because the lag the filter creates can be calculated as demonstrated graphically 855 and algorithmically compensated for in software if an increased level of accuracy is required. The 0.8 Hz low pass filter is shown as trace 853 and the difference created by the difference in lag between filters is approximately 0.2 grams.

The difference in weight measured by the dual low pass filters with input from the same weight scale ADC has the advantage of distinguishing between a real increase in weight which will occur as a linear ramp as shown in FIG. 16 and FIG. 17 or in the case of a leak as a linear decay in the measured weight and the changes expected due to oscillation frequencies of 0.78 Hz and above when the weight scale is perturbed by its natural frequency or pendulum motion. If the weight increases are real and in the expected range the dual filters will track each other within the expected lag between filters which for a maximum ultrafiltration rate of 500 ml/hr has been demonstrated to be less than 0.2 grams. If the weight scale is being manipulated by someone physically the filters will no longer track each other because of these perturbations will result in the low pass filters going out of synchronization.

Figure 18:
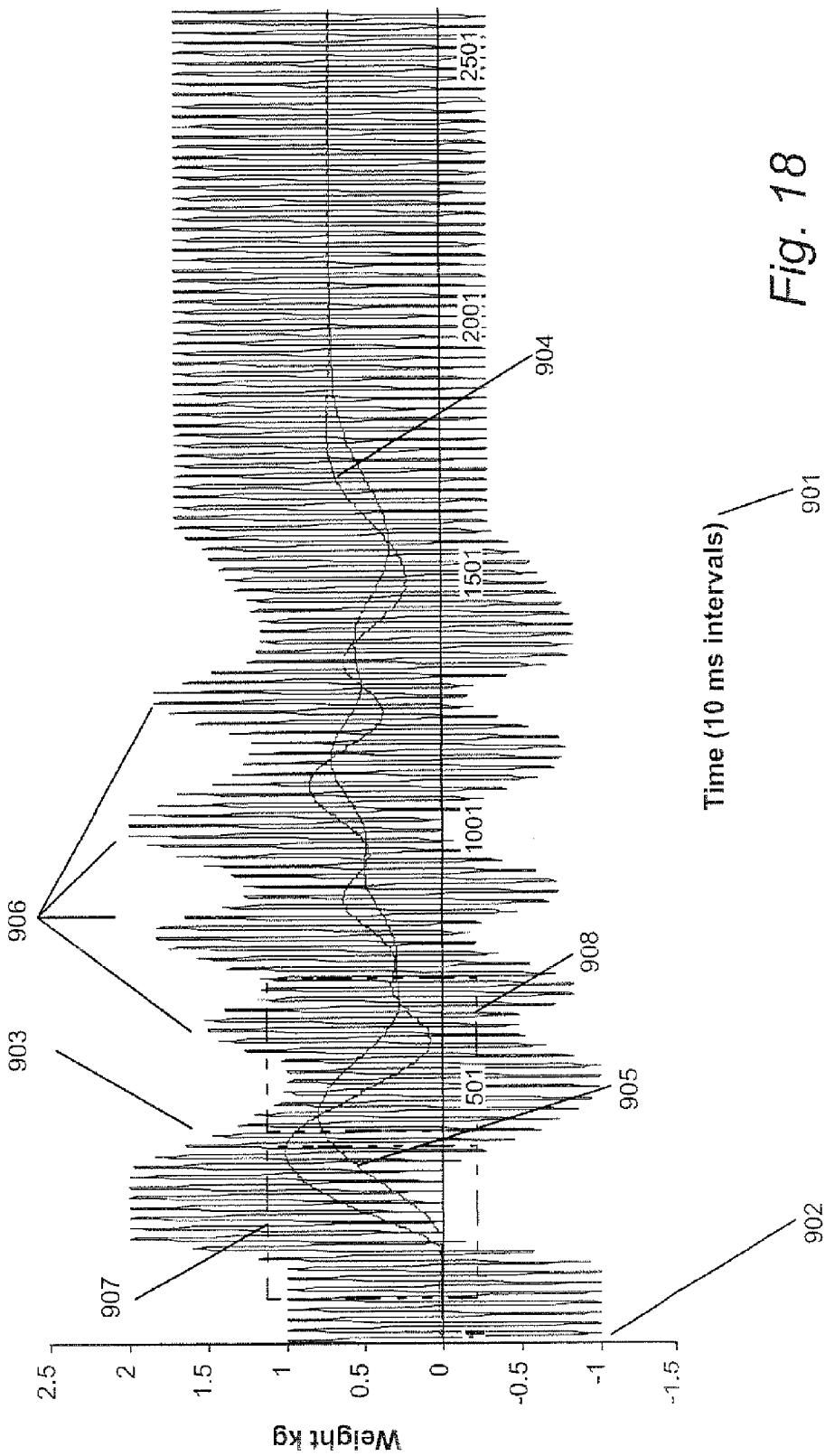
FIG. 18 is a graph of the response of dual filters with 5 Hz signal natural frequency imposed upon rapid increases and decreases in weight demonstrating how the dual filters no longer track each other.

FIG. 18 shows a graph of the response of dual filters (filter responses shown as 904, 905) to a weight scale input with a 5 Hz sinusoidal weight signal 903 superimposed upon the measured weight (natural frequency of weight scale). The measured weight is also rapidly increasing and decreasing simulating a person tugging on the ultrafiltrate bag as shown by the oscillations with a frequency of approximately 0.33 Hz 906; the traces also show an ultrafiltrate pump over filtrating as shown by the trace segment 907 and a leak in the ultrafiltrate bag as shown by trace segment 908. The x-axis 901 shows time in increments of 10 ms and the y-axis 902 shows the weight in kg. These perturbations are well above the fluid flow rates expected by the bag and well below the 0.87 Hz pendulum frequency and 5 Hz natural frequency of the weight scale. Thus the dual filters deviate considerably from each other and no longer meet the 20 gram difference algorithm between the dual filters described in 704 of FIG. 11 for the measurement of a stable weight.

Testing has been performed in the laboratory and in the field with this noise rejection algorithm implemented in software on a System 100 ultrafiltration device and it has been shown to work well at rejecting false alarms. The algorithm is capable of distinguishing false alarm conditions such as when the device is either moved by the user or by the patient and real world alarm conditions. Users are able to unhook the ultrafiltrate bag and take visual readings, replace the ultrafiltrate bag back on the weight scale hook and chain without causing the annunciation of alarms. Patients have been able to walk the hallways without compromising the safety system or creating false alerts due to the robustness of this algorithm while maintaining operational safety. Such an algorithm can also be implemented as a bandpass filter or with moving average filters instead of low pass filters. A bandpass filter allows frequencies between an upper and lower frequency through attenuating all other frequencies. Moving averages require more calculations per time cycle which is an advantage of a low pass filter.

Figure 19:
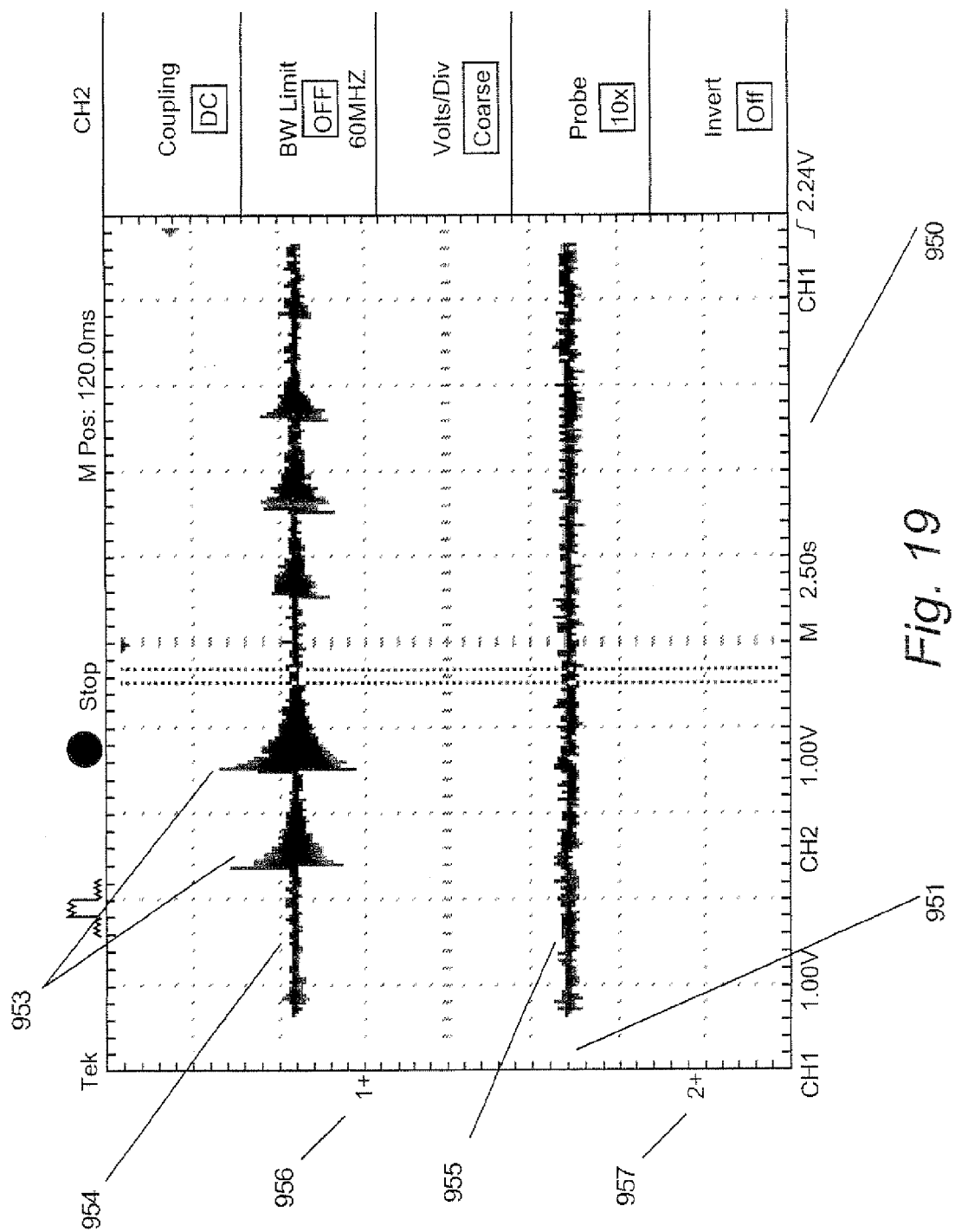
FIG. 19 is a graph from a Tektronix oscilloscope of the amplified 0.3 Hz hardware filtered weight signal and the unfiltered amplified weight signal with weight gain of 500 ml/min.

FIG. 19 shows a graph from a Tektronix oscilloscope of the amplified 0.3 Hz hardware filtered weight signal and the unfiltered amplified weight signal for a System 100 device performing ultrafiltration at 500 ml/min. The x-axis 950 shows the time in second and the y-axis 951 is in volts. Two traces are shown, trace 2 the hardware filter 0.3 Hz 2 pole low pass filter signal 955 and trace 1 the unfiltered amplified weight scale sensor signal 954. The ground reference signal for the filtered and unfiltered weights signals are shown as 956 for trace 1 and 957 for trace 2. The weight scale was intentionally perturbed by pushing on the weight scale beam and bag when an ultrafiltrate weight of 602 grams was attached. These perturbations can be seen designated as 953 on unfiltered weight signal 954. The ultrafiltrate bag was prodded and allowed to swing freely at the pendulum frequency as well as vibrate at its natural frequency. The device was moved during this process by rolling of the cart. 1 volt on the y-axis is equivalent to approximately 0.75 kg therefore the peaks in the perturbations can be seen to read as high as 1.125 kg. At the same time the weight scale data output from the noise rejection algorithm described in FIG. 11 was captured from the digital data output by the main control processor CPU 601 via an RS232 port 640 connected via a null modem cable to a personal computer.

Figure 20:
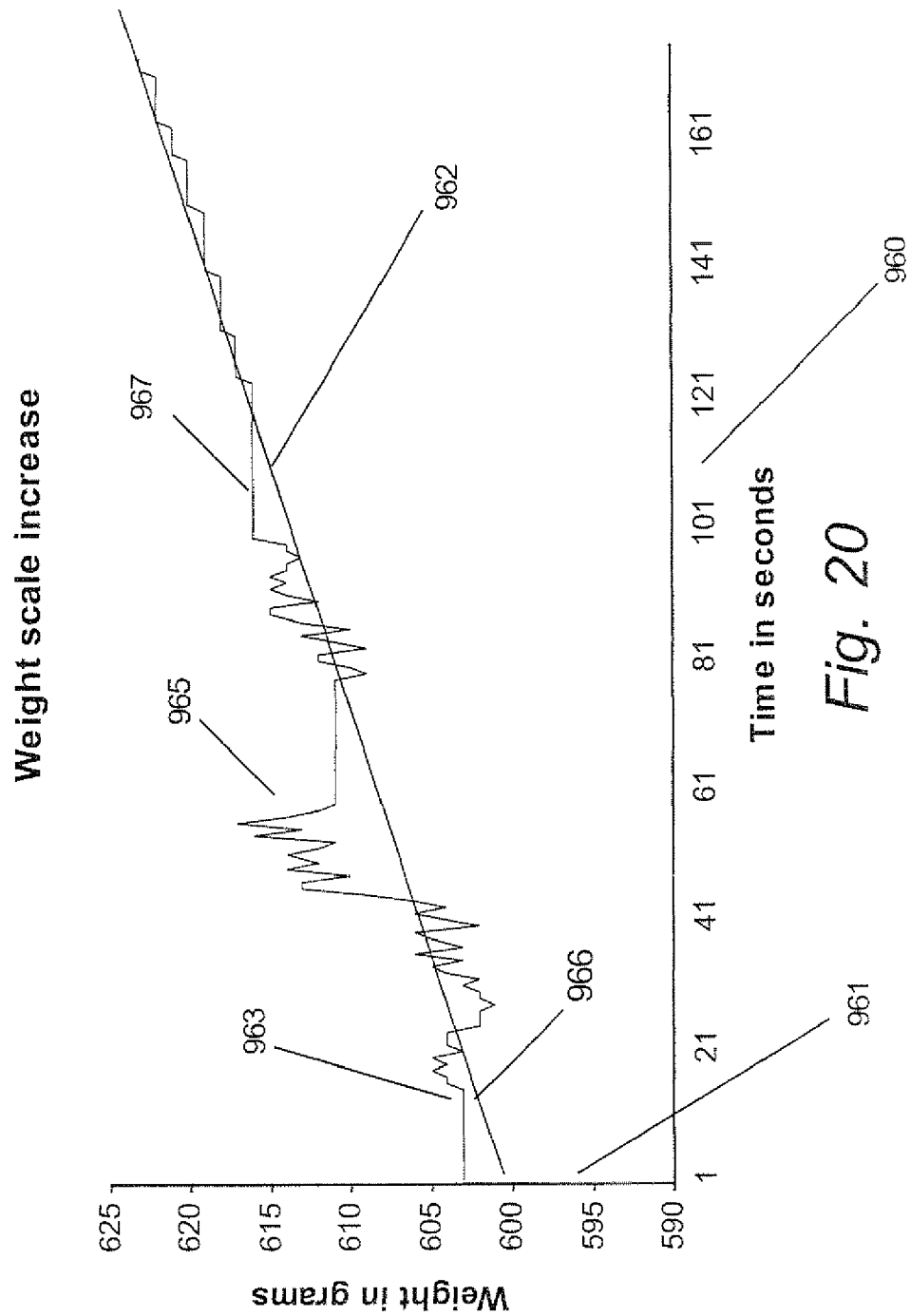
FIG. 20 is a graph of the weight data output from the low pass band algorithm collected with a PC during the same period of perturbations shown in FIG. 19.

FIG. 20 shows a graph of the weight data 963 collected from the PC during the same period of perturbations shown in FIG. 19. The x-axis 960 shows time in seconds. The y-axis 961 shows weight in grams. The trace 963 is a graph of the weight data collected by the PC Vs time. Ultrafiltration was started at approximately 20 seconds 966 into data collection. The graph shows how the noise rejection algorithm was able to distinguish between the false perturbations FIG. 19 953 and real data without annunciating an alarm. Some error 965 did result during these aggressive perturbations but it was never measured to be greater than 10 grams. This is excellent noise rejection when the original unfiltered weight signal showed approximately a 1.125 kg peak to peak of oscillatory noise FIG. 19 953. The slope 962 shows that approximately 20 grams of fluid were removed in 140 seconds which equates to 514 ml/hr. This is an error of only 2.8% when compared to the set ultrafiltrate rate of 500 ml/hr. The perturbations were stopped at time 120 seconds 967.

During operation occlusions in the withdrawal and infusion peripheral lines can intermittently occur whereupon the ultrafiltration device stops the ultrafiltration pump when the blood pump flow drops below 35 ml/min based upon a pressure control algorithm which uses the withdrawal and infusion pressure sensors as feedback. This pressure control algorithm is disclosed in U.S. Pat. No. 6,585,675. Since the ultrafiltrate pump is no longer rotating the weight scale is not expecting to see a weight increase. The weight scale mismatch alarm is not based upon the set ultrafiltrate rate, it is based upon the rate at which the pump is able to extract ultrafiltrate. The volume extracted by the ultrafiltrate pump is compared with the weight increase seen by the weight scale. It should be noted that the SG of ultrafiltrate is equal to 1.00 so 1 gram is equal to 1 ml. This alarm methodology has the advantage of avoiding nuisance alarms when peripheral access is momentarily occluded.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A weight scale comprising:
 a measuring electronic circuit including a filter;
 a load cell attachable to a support housing and generating a load signal processed by the filter of the electronic circuit;
 a spring coupled to the load cell to apply a force to the load cell, wherein the load signal is indicative of the force, and
 a scale beam connected to the spring and to the support housing,
 wherein a weight to be measured is attached to the scale beam and the force applied by the spring is indicative of the weight, and wherein natural frequencies of the weight and spring is higher than a cut-off frequency of the filter.

2. A weight scale as in claim 1 wherein the weight is a bag into which a fluid is being introduced.

3. A weight scale as in claim 1 wherein a frequency response of the electronic circuit is higher than a frequency response required to measure a rate of the desired weight change.

4. A weight scale as in claim 1 wherein the filter includes a first low-pass filter having a first cut-off frequency and a second low-pass filter having a second-cutoff frequency higher than the first cut-off frequency, and the second cut-off frequency is below the natural frequency.

5. A method as in claim 1 wherein the natural frequencies include a range of natural frequencies resulting form a changing mass of the weight.

6. A method for rejecting excessive noise in a signal indicative of a physical condition, the method comprising:
 generating a first filtered signal by filtering the signal to remove fluctuations in the signal having a frequency above a first threshold frequency;
 generating a second filtered signal by filtering the signal to remove fluctuations in the signal having a frequency above a second threshold frequency, wherein the second threshold frequency is at a higher frequency than the first threshold frequency and the second threshold frequency is below a natural frequency of the physical system; and
 if a difference between the first filtered signal and the second filtered signal remains within a predetermined amount for a predetermine time period, determining that the signal is reliably indicative of the physical condition.

7. A method as in claim 6 wherein the first and second frequencies are less than a natural frequency of a weight and spring, where the weight is the physical system.

8. A method as in claim 6 wherein a ratio of the second threshold frequency and the first threshold frequency is four.

9. A method as in claim 6 wherein the first threshold frequency is 0.16 Hertz (Hz) and the second threshold frequency is 0.8 Hz.

10. A method as in claim 6 wherein, before the signal is filtered to generated the first filtered signal and the second filtered signal, the signal is initially filtered to remove fluctuations in the signal having a frequency above a third threshold frequency, wherein the third threshold frequency is a frequency higher than the first threshold frequency and lower than the second threshold frequency.

11. A method as in claim 10 wherein a ratio of the third threshold frequency and the first threshold frequency is above 2.6.

12. A method as in claim 11 wherein the first threshold frequency is 0.16 Hz, the second threshold frequency is 0.8 Hz, and the third threshold frequency is 0.3 Hz.

13. A method as in claim 12 wherein the predetermined time period is a plurality of seconds.

14. A method as in claim 13 wherein the signal is a signal indicative of a varying physical condition.

15. A method as in claim 11 wherein the physical condition is a variable weight.

16. A method for evaluating an oscillating signal having information indicative of a variable physical condition, the method comprising:

generating a leading signal by filtering a variable signal indicative of the variable physical condition to remove fluctuations having a frequency above a high threshold frequency which is above any natural frequency of the variable physical condition;

generating a trailing filtered signal by filtering the variable physical condition signal to remove fluctuations having a frequency above a low threshold frequency, which is below the high threshold frequency, and if a difference between the trailing filtered signal and the leading filtered signal remains within a predetermined limit for a predetermine plurality of seconds, determining that the trailing filtered signal is sufficiently settled to reliably indicate the physical condition signal.

17. A method as in claim 16 wherein the low threshold frequency is 0.16 Hertz (Hz) and the high threshold frequency is 0.8 Hz.

18. A method as in claim 16 wherein the variable physical condition is a varying weight, and the method further comprises determining if at least one of trailing filtered signal and the leading filtered signal exceeds a predetermined maximum weight for a plurality of minutes.

19. A method as in claim 16 wherein the oscillating signal is a signal from a strain gauge.

20. A method as in claim 16 wherein the variable physical condition has a natural frequency greater than the high threshold frequency 21. A system for processing an oscillating signal indicative of a varying physical condition, the system comprising:

a low-pass filter having an input for the oscillating signal and outputting a first filtered signal from which have been suppressed fluctuations above a middle threshold frequency in the oscillating signal;

a second filter having as input for the first filtered signal and an output for a leading signal, wherein the second filter suppresses fluctuations in the first filtered signal having a frequency above a high threshold frequency, wherein the high threshold frequency is a higher frequency than the middle threshold frequency;

a third filter having as input for the first filtered signal and an output for a trailing signal, wherein the third filter suppresses fluctuations in the first filtered signal having a frequency above a low threshold frequency, wherein the middle threshold frequency is a higher frequency than the lower threshold frequency;

a comparator for comparing the trailing filtered signal and the leading filtered signal over a predetermined plurality of seconds, and a processor determining whether the first filtered signal is sufficiently settled to reliably indicate the variable weight.

22. A system as in claim 21 wherein a ratio of the middle threshold frequency to the low threshold frequency is greater than one and less than three, and the ratio of the high threshold frequency to the middle threshold frequency is between two and three.

23. A system as in claim 21 wherein the low threshold frequency is 0.16 Hertz (Hz), the middle threshold frequency is 0.3 Hz, and the high threshold frequency is 0.8 Hz.

24. A system as in claim 21 wherein the varying physical condition is a varying weight, and system further comprises weight scale connected to a beam from which the weight hangs.

25. A system as in claim 24 further comprising a strain gauge on the beam and the strain gauge generates a signal indicative of the force exerted by the weight attached to the beam.

26. A system as in claim 21 wherein the system is included in a controller for an extracorporeal circuit, and the weight is a fluid collection bag and the system further comprises a beam from which hangs the fluid collection bag, and a strain gauge on the beam which generates a signal indicative of a force exerted by the weight attached to the beam.

27. A system as in claim 21 wherein the first, second and third filters are digital filters in a digital controller which includes the comparator and the processor.

28. A system as in claim 21 wherein the first, second and third filters are analog filters input to a digital controller which includes the comparator and the processor.

29. A system as in claim 24 wherein the weight scale includes a spring connected to the weight and the weight and spring have natural frequencies higher than the high threshold frequency.

* * * * *